US012088377B2

(12) United States Patent
Wu et al.

(10) Patent No.: US 12,088,377 B2
(45) Date of Patent: Sep. 10, 2024

(54) COEFFICIENT INDICATION FOR CHANNEL STATE INFORMATION

(71) Applicant: Qualcomm Incorporated, San Diego, CA (US)

(72) Inventors: Liangming Wu, Beijing (CN); Chao Wei, Beijing (CN); Qiaoyu Li, Beijing (CN); Chenxi Hao, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/429,065

(22) PCT Filed: Feb. 15, 2019

(86) PCT No.: PCT/CN2019/075220
§ 371 (c)(1),
(2) Date: Aug. 6, 2021

(87) PCT Pub. No.: WO2020/164108
PCT Pub. Date: Aug. 20, 2020

(65) Prior Publication Data
US 2022/0131585 A1  Apr. 28, 2022

(51) Int. Cl.
*H04B 7/06* (2006.01)
(52) U.S. Cl.
CPC ......... *H04B 7/0626* (2013.01); *H04B 7/0634* (2013.01)
(58) Field of Classification Search
CPC ..... G03F 1/40; G03F 1/46; G03F 1/50; H04B 7/0417; H04B 7/0626; H04B 7/063;
(Continued)

(56) References Cited

U.S. PATENT DOCUMENTS 6,320,852 B1 * 11/2001 Obuchi ................. H04L 1/0059
                                                            370/324
8,861,391 B1 * 10/2014 Zhang .................. H04B 7/0619
                                                            370/312
(Continued)

FOREIGN PATENT DOCUMENTS

CN     101127582 A     2/2008
CN     104283828 A     1/2015
(Continued)

OTHER PUBLICATIONS

International Search Report and Written Opinion—PCT/CN2019/075220—ISA/EPO—May 5, 2019.
(Continued)

*Primary Examiner* — Stephen J Clawson
(74) *Attorney, Agent, or Firm* — Holland & Hart LLP

(57) ABSTRACT

Methods, systems, and devices for wireless communications are described. A user equipment (UE) may perform channel state information measurements on reference signal transmissions from a base station. The UE may identify a set of cross layer coefficients associated with a set of spatial layers based on the channel state information measurements. The UE may additionally identify a set of precoding coefficients associated with a spatial layer from the set of spatial layers. In some implementations, the set of precoding coefficients may be based on the set of cross layer coefficients. In some examples, the UE may transmit the set of cross layer coefficients and the set of precoding coefficients to the base station.

34 Claims, 19 Drawing Sheets

(58) Field of Classification Search
CPC .. H04B 7/0634; H04B 7/0639; H04B 7/0645; H04B 7/0663; H04B 7/0682
See application file for complete search history.

(56) References Cited

U.S. PATENT DOCUMENTS

| | | | |
|---|---|---|---|
| 2009/0110114 A1* | 4/2009 | Onggosanusi | H04B 7/0639 375/299 |
| 2011/0141982 A1* | 6/2011 | Zhang | H04L 27/2613 370/329 |
| 2011/0268100 A1* | 11/2011 | Gorokhov | H04B 7/0456 370/342 |
| 2013/0064318 A1 | 3/2013 | Liu et al. | |
| 2013/0329649 A1* | 12/2013 | Wernersson | H04B 7/0469 370/329 |
| 2014/0146756 A1* | 5/2014 | Sahin | H04L 1/1607 370/328 |
| 2015/0139292 A1* | 5/2015 | Shirani-Mehr | H04W 24/00 375/227 |
| 2016/0156397 A1 | 6/2016 | Onggosanusi et al. | |
| 2017/0279514 A1 | 9/2017 | Rahman et al. | |
| 2019/0007106 A1 | 1/2019 | Park et al. | |
| 2019/0326974 A1* | 10/2019 | Li | H04B 7/0634 |
| 2021/0351828 A1* | 11/2021 | Gao | H04B 7/0634 |

FOREIGN PATENT DOCUMENTS

| | | |
|---|---|---|
| TW | 201906450 A | 2/2019 |
| WO | WO-2018056786 A1 | 3/2018 |
| WO | WO-2018174636 A2 | 9/2018 |
| WO | WO-2018182256 A1 | 10/2018 |

OTHER PUBLICATIONS

Taiwan Search Report—TW109100433—TIPO—Jan. 29, 2023.
Supplementary European Search Report—EP19915345—Search Authority—Munich—Aug. 19, 2022.
ZTE: "Investigation on Explicit Channel Matrix Feedback in Comp", 3GPP TSG RAN WG1 Meeting #57-bis, R1-092475, Los Angeles, USA, Jun. 29-Jul. 3, 2009, 3 Pages, Jul. 3, 2009.

* cited by examiner

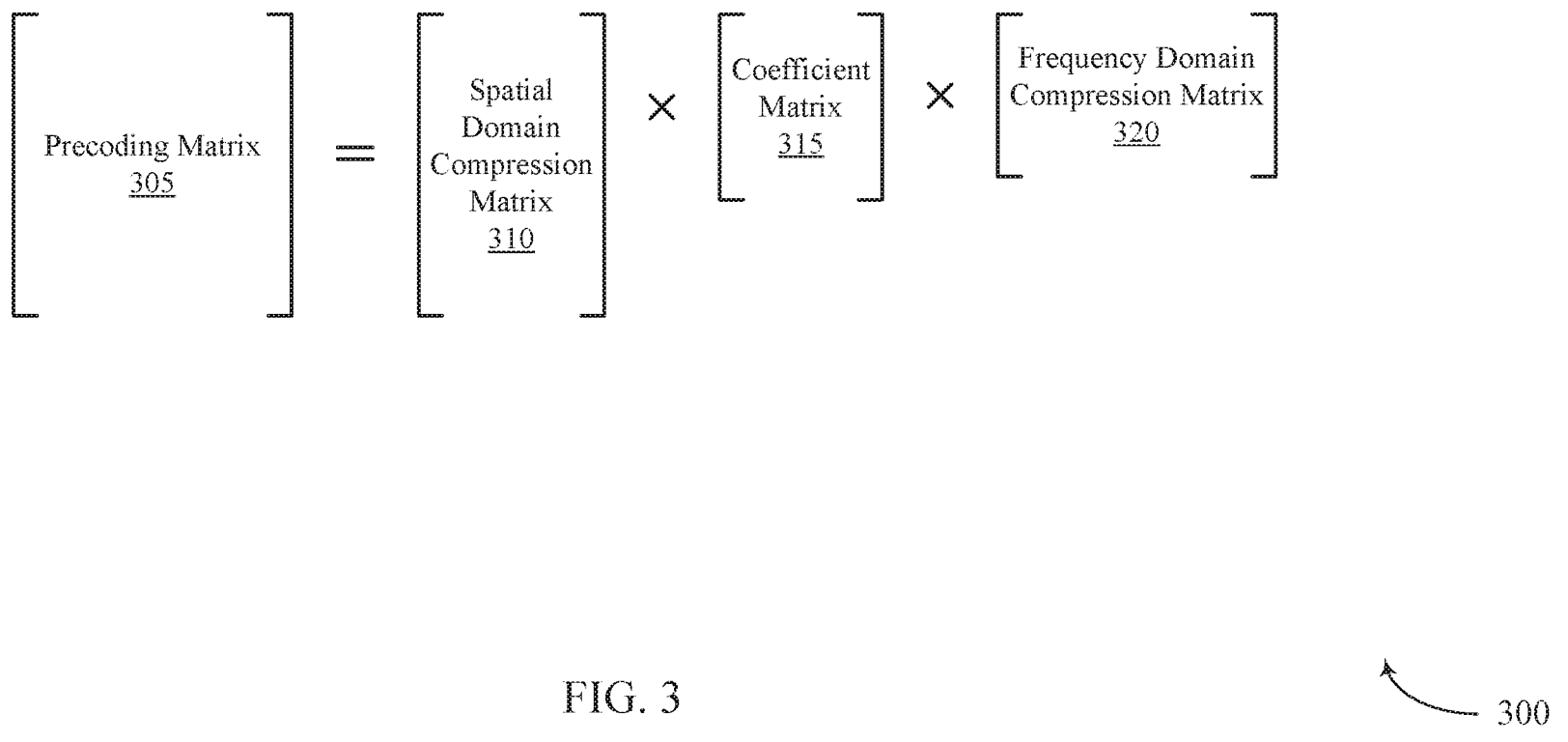

[Precoding Matrix 305] = [Spatial Domain Compression Matrix 310] × [Coefficient Matrix 315] × [Frequency Domain Compression Matrix 320]

FIG. 3

COEFFICIENT INDICATION FOR CHANNEL STATE INFORMATION

CROSS REFERENCE TO RELATED APPLICATION

The present application is a 371 national phase filing of International Patent Application No. PCT/CN2019/075220 by Wu et al., entitled "COEFFICIENT INDICATION FOR CHANNEL STATE INFORMATION," filed Feb. 15, 2019, which is assigned to the assignee hereof, and which is expressly incorporated by reference in its entirety herein.

BACKGROUND

The following relates generally to wireless communications, and more specifically to coefficient indication for channel state information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications system, wireless devices may implement a precoder (e.g., a precoding matrix) for improving multiple input-multiple output (MIMO) communication performance based on a linear combination codebook. For example, a base station may select the precoder from the codebook based on a linear combination of discrete Fourier transform (DFT) beams. However, for the base station to select the precoder for communicating with a UE, the base station may receive a precoding matrix indicator (PMI) from the UE, where the PMI indicates beam combination coefficient information. As the amount of feedback increases, the overhead of providing the feedback may result in reduced efficiency or excess latency in the communications for the wireless devices.

SUMMARY

The described techniques relate to improved methods, systems, devices, and apparatuses that support coefficient indication for channel state information. Generally, the described techniques provide for reducing reporting overhead. In some wireless communications systems (e.g., multiple input-multiple output (MIMO) systems), a user equipment (UE) may report basis subset selection for a set of beams, and the base station may use the basis vectors to determine a precoding matrix for communicating with the UE (e.g., a precoder selected from a linear combination codebook). To reduce the reporting overhead, the UE may report a set of cross layer coefficients, where the cross layer coefficients may indicate precoding coefficients that are common across multiple spatial layers. In some implementations, the UE may perform channel state information measurements on reference signal transmissions from the base station, and may identify a set of cross layer coefficients associated with a set of spatial layers. The UE may determine a number of bits associated with the plurality of basis vectors for the set of beams. The UE may further determine that a subset of the number of bits is associated with the set of cross layer coefficients. In order to transmit the set of cross layer coefficients, the UE may set each bit of the subset of the determined number of bits to one and set a remaining number of bits to zero. In some implementations, the UE may identify a set of precoding coefficients associated with a spatial layer from the set of spatial layers, and transmit the set of cross layer coefficients and the set of precoding coefficients to the base station.

A method of wireless communication at a user equipment is described. The method may include performing channel state information measurements on one or more reference signal transmissions from a base station, identifying, based on the channel state information measurements, a set of cross layer coefficients associated with a set of spatial layers, identifying, based on the set of cross layer coefficients, a set of precoding coefficients associated with a spatial layer from the set of spatial layers, and transmitting the set of cross layer coefficients and the set of precoding coefficients to the base station.

An apparatus for wireless communication at a user equipment is described. The apparatus may include a processor, memory in electronic communication with the processor, and instructions stored in the memory. The instructions may be executable by the processor to cause the apparatus to perform channel state information measurements on one or more reference signal transmissions from a base station, identify, based on the channel state information measurements, a set of cross layer coefficients associated with a set of spatial layers, identify, based on the set of cross layer coefficients, a set of precoding coefficients associated with a spatial layer from the set of spatial layers, and transmit the set of cross layer coefficients and the set of precoding coefficients to the base station.

Another apparatus for wireless communication at a user equipment is described. The apparatus may include means for performing channel state information measurements on one or more reference signal transmissions from a base station, identifying, based on the channel state information measurements, a set of cross layer coefficients associated with a set of spatial layers, identifying, based on the set of cross layer coefficients, a set of precoding coefficients associated with a spatial layer from the set of spatial layers, and transmitting the set of cross layer coefficients and the set of precoding coefficients to the base station.

A non-transitory computer-readable medium storing code for wireless communication at a user equipment is described. The code may include instructions executable by a processor to perform channel state information measurements on one or more reference signal transmissions from a base station, identify, based on the channel state information measurements, a set of cross layer coefficients associated with a set of spatial layers, identify, based on the set of cross layer coefficients, a set of precoding coefficients associated with a spatial layer from the set of spatial layers, and transmit the set of cross layer coefficients and the set of precoding coefficients to the base station.

Some examples of the method, apparatuses, and non-transitory computer-readable medium described herein may further include operations, features, means, or instructions for determining, based on the channel state information measurements, a set of basis vectors for a set of beams, and determining a number of bits associated with the set of basis vectors for the set of beams, where transmitting the set of cross layer coefficients may be based on the number of bits. In some examples of the method, apparatuses, and non-transitory computer-readable medium described herein, the set of cross layer coefficients may be transmitted using a subset of the determined number of bits.

Some examples of the method, apparatuses, and non-transitory computer-readable medium described herein may further include operations, features, means, or instructions for setting each bit of the subset of the determined number of bits to one and setting a remaining number of bits to zero, where the subset of the determined number of bits indicates one or more locations of the set of cross layer coefficients.

Some examples of the method, apparatuses, and non-transitory computer-readable medium described herein may further include operations, features, means, or instructions for receiving, from the base station, an indication of the set of cross layer coefficients, where identifying the set of cross layer coefficients may be based on the received indication.

In some examples of the method, apparatuses, and non-transitory computer-readable medium described herein, the set of cross layer coefficients may be based on at least one of a number of basis vectors, a number of beams, a number of frequency domain dimensions, or a combination thereof.

Some examples of the method, apparatuses, and non-transitory computer-readable medium described herein may further include operations, features, means, or instructions for determining a number of bits associated with the set of cross layer coefficients, and transmitting, to the base station, a bitmap indicating the set of precoding coefficients associated with the spatial layer from the set of spatial layers, where a length of the bitmap may be based on the number of bits associated with the set of cross layer coefficients.

In some examples of the method, apparatuses, and non-transitory computer-readable medium described herein, a first precoding coefficient associated with a first spatial layer may be different from a second precoding coefficient associated with a second spatial layer. In some examples of the method, apparatuses, and non-transitory computer-readable medium described herein, the set of cross layer coefficients and the set of precoding coefficients may be same across a first polarization and a second polarization.

In some examples of the method, apparatuses, and non-transitory computer-readable medium described herein, the set of cross layer coefficients and the set of precoding coefficients may be different across a first polarization and a second polarization. In some examples of the method, apparatuses, and non-transitory computer-readable medium described herein, one or more cross layer coefficients includes one or more precoding coefficients associated with two or more spatial layers.

Some examples of the method, apparatuses, and non-transitory computer-readable medium described herein may further include operations, features, means, or instructions for encoding the set of cross layer coefficients associated with the set of spatial layers to obtain a first encoded report, and encoding the set of precoding coefficients associated with the spatial layer from the set of spatial layers to obtain a second encoded report, where transmitting the set of cross layer coefficients and the set of precoding coefficients includes transmitting the first encoded report and the second encoded report.

Some examples of the method, apparatuses, and non-transitory computer-readable medium described herein may further include operations, features, means, or instructions for encoding the set of cross layer coefficients associated with the set of spatial layers and the set of precoding coefficients associated with the spatial layer from the set of spatial layers to obtain an encoded report, where transmitting the set of cross layer coefficients and the set of precoding coefficients includes transmitting the encoded report.

Some examples of the method, apparatuses, and non-transitory computer-readable medium described herein may further include operations, features, means, or instructions for transmitting a channel state information report including the set of cross layer coefficients and the set of precoding coefficients.

A method of wireless communication at a base station is described. The method may include receiving, from a user equipment, a set of cross layer coefficients associated with a set of spatial layers, receiving, from the user equipment, a set of precoding coefficients associated with a spatial layer from the set of spatial layers, where the set of precoding coefficients is based on the set of cross layer coefficients, and determining a set of basis vectors based on the set of cross layer coefficients and the set of precoding coefficients, where the set of basis vectors is used for determining a coefficient matrix.

An apparatus for wireless communication at a base station is described. The apparatus may include a processor, memory in electronic communication with the processor, and instructions stored in the memory. The instructions may be executable by the processor to cause the apparatus to receive, from a user equipment, a set of cross layer coefficients associated with a set of spatial layers, receive, from the user equipment, a set of precoding coefficients associated with a spatial layer from the set of spatial layers, where the set of precoding coefficients is based on the set of cross layer coefficients, and determine a set of basis vectors based on the set of cross layer coefficients and the set of precoding coefficients, where the set of basis vectors is used for determining a coefficient matrix.

Another apparatus for wireless communication at a base station is described. The apparatus may include means for receiving, from a user equipment, a set of cross layer coefficients associated with a set of spatial layers, receiving, from the user equipment, a set of precoding coefficients associated with a spatial layer from the set of spatial layers, where the set of precoding coefficients is based on the set of cross layer coefficients, and determining a set of basis vectors based on the set of cross layer coefficients and the set of precoding coefficients, where the set of basis vectors is used for determining a coefficient matrix.

A non-transitory computer-readable medium storing code for wireless communication at a base station is described. The code may include instructions executable by a processor to receive, from a user equipment, a set of cross layer coefficients associated with a set of spatial layers, receive, from the user equipment, a set of precoding coefficients associated with a spatial layer from the set of spatial layers, where the set of precoding coefficients is based on the set of cross layer coefficients, and determine a set of basis vectors based on the set of cross layer coefficients and the set of precoding coefficients, where the set of basis vectors is used for determining a coefficient matrix.

Some examples of the method, apparatuses, and non-transitory computer-readable medium described herein may further include operations, features, means, or instructions for identifying a number of bits associated with the set of basis vectors for a set of beams, where receiving the set of cross layer coefficients may be based on the number of bits. In some examples of the method, apparatuses, and non-transitory computer-readable medium described herein, the set of cross layer coefficients may be received using a subset of the determined number of bits.

Some examples of the method, apparatuses, and non-transitory computer-readable medium described herein may further include operations, features, means, or instructions for identifying that each bit of the subset of the determined number of bits may be set to one, and identifying that a remaining number of bits may be set to zero, where the subset of the determined number of bits indicates one or more locations of the set of cross layer coefficients.

Some examples of the method, apparatuses, and non-transitory computer-readable medium described herein may further include operations, features, means, or instructions for transmitting, to the user equipment, an indication of the set of cross layer coefficients, where receiving the set of cross layer coefficients may be based on the transmitted indication.

In some examples of the method, apparatuses, and non-transitory computer-readable medium described herein, the set of cross layer coefficients may be based on at least one of a number of basis vectors, a number of beams, a number of frequency domain dimensions, or a combination thereof. Some examples of the method, apparatuses, and non-transitory computer-readable medium described herein may further include operations, features, means, or instructions for receiving, from the user equipment, a bitmap indicating the set of precoding coefficients associated with the spatial layer from the set of spatial layers, where a length of the bitmap may be based on a number of bits associated with the set of cross layer coefficients.

In some examples of the method, apparatuses, and non-transitory computer-readable medium described herein, a first precoding coefficient associated with a first spatial layer may be different from a second precoding coefficient associated with a second spatial layer. In some examples of the method, apparatuses, and non-transitory computer-readable medium described herein, the set of cross layer coefficients and the set of precoding coefficients may be same across a first polarization and a second polarization. In some examples of the method, apparatuses, and non-transitory computer-readable medium described herein, the set of cross layer coefficients and the set of precoding coefficients may be different across a first polarization and a second polarization.

In some examples of the method, apparatuses, and non-transitory computer-readable medium described herein, one or more cross layer coefficients includes one or more precoding coefficients associated with two or more spatial layers. Some examples of the method, apparatuses, and non-transitory computer-readable medium described herein may further include operations, features, means, or instructions for decoding a first encoded report to obtain the set of cross layer coefficients associated with the set of spatial layers, and decoding a second encoded report to obtain the set of precoding coefficients associated with the spatial layer from the set of spatial layers, where receiving the set of cross layer coefficients and the set of precoding coefficients includes receiving the first encoded report and the second encoded report.

Some examples of the method, apparatuses, and non-transitory computer-readable medium described herein may further include operations, features, means, or instructions for decoding an encoded report to obtain the set of cross layer coefficients associated with the set of spatial layers and the set of precoding coefficients associated with the spatial layer from the set of spatial layers, where receiving the set of cross layer coefficients and the set of precoding coefficients includes receiving the encoded report. Some examples of the method, apparatuses, and non-transitory computer-readable medium described herein may further include operations, features, means, or instructions for receiving a channel state information report including the set of cross layer coefficients and the set of precoding coefficients.

A method of wireless communication at a user equipment is described. The method may include performing channel state information measurements on one or more reference signal transmissions from a base station, determining, based on the channel state information measurements, a set of basis vectors for a set of beams and a parameter, where a value of the parameter is based on a number of spatial layers associated with the user equipment, determining a set of precoding coefficients based on the set of basis vectors and the parameter, and transmitting the set of precoding coefficients to the base station.

An apparatus for wireless communication at a user equipment is described. The apparatus may include a processor, memory in electronic communication with the processor, and instructions stored in the memory. The instructions may be executable by the processor to cause the apparatus to perform channel state information measurements on one or more reference signal transmissions from a base station, determine, based on the channel state information measurements, a set of basis vectors for a set of beams and a parameter, where a value of the parameter is based on a number of spatial layers associated with the user equipment, determine a set of precoding coefficients based on the set of basis vectors and the parameter, and transmit the set of precoding coefficients to the base station.

Another apparatus for wireless communication at a user equipment is described. The apparatus may include means for performing channel state information measurements on one or more reference signal transmissions from a base station, determining, based on the channel state information measurements, a set of basis vectors for a set of beams and a parameter, where a value of the parameter is based on a number of spatial layers associated with the user equipment, determining a set of precoding coefficients based on the set of basis vectors and the parameter, and transmitting the set of precoding coefficients to the base station.

A non-transitory computer-readable medium storing code for wireless communication at a user equipment is described. The code may include instructions executable by a processor to perform channel state information measurements on one or more reference signal transmissions from a base station, determine, based on the channel state information measurements, a set of basis vectors for a set of beams and a parameter, where a value of the parameter is based on a number of spatial layers associated with the user equipment, determine a set of precoding coefficients based on the set of basis vectors and the parameter, and transmit the set of precoding coefficients to the base station.

Some examples of the method, apparatuses, and non-transitory computer-readable medium described herein may further include operations, features, means, or instructions for receiving a set of predefined values associated with the parameter, where determining the parameter may be based on selecting a predefined value from the set of predefined values. In some examples of the method, apparatuses, and non-transitory computer-readable medium described herein, a first value of the parameter associated with a first set of spatial layers may be different from a second value of the parameter associated with a second set of spatial layers.

A method of wireless communication at a base station is described. The method may include receiving, from a user equipment, a set of precoding coefficients, decoding the set of precoding coefficients to obtain a set of basis vectors for a set of beams and a parameter, where a value of the parameter is based on a number of spatial layers associated with the user equipment, and determining a coefficient matrix based on the set of basis vectors for the set of beams and the parameter.

An apparatus for wireless communication at a base station is described. The apparatus may include a processor, memory in electronic communication with the processor, and instructions stored in the memory. The instructions may be executable by the processor to cause the apparatus to receive, from a user equipment, a set of precoding coefficients, decode the set of precoding coefficients to obtain a set of basis vectors for a set of beams and a parameter, where a value of the parameter is based on a number of spatial layers associated with the user equipment, and determine a coefficient matrix based on the set of basis vectors for the set of beams and the parameter.

Another apparatus for wireless communication at a base station is described. The apparatus may include means for receiving, from a user equipment, a set of precoding coefficients, decoding the set of precoding coefficients to obtain a set of basis vectors for a set of beams and a parameter, where a value of the parameter is based on a number of spatial layers associated with the user equipment, and determining a coefficient matrix based on the set of basis vectors for the set of beams and the parameter.

A non-transitory computer-readable medium storing code for wireless communication at a base station is described. The code may include instructions executable by a processor to receive, from a user equipment, a set of precoding coefficients, decode the set of precoding coefficients to obtain a set of basis vectors for a set of beams and a parameter, where a value of the parameter is based on a number of spatial layers associated with the user equipment, and determine a coefficient matrix based on the set of basis vectors for the set of beams and the parameter.

Some examples of the method, apparatuses, and non-transitory computer-readable medium described herein may further include operations, features, means, or instructions for transmitting, to the user equipment, a set of predefined values associated with the parameter, where the parameter may be based on selecting a predefined value from the set of predefined values. In some examples of the method, apparatuses, and non-transitory computer-readable medium described herein, a first value of the parameter associated with a first set of spatial layers may be different from a second value of the parameter associated with a second set of spatial layers.

BRIEF DESCRIPTION OF THE DRAWINGS

FIG. 3 illustrates an example of a matrix operation that supports coefficient indication for channel state information in accordance with aspects of the present disclosure.

DETAILED DESCRIPTION

Figure 1:
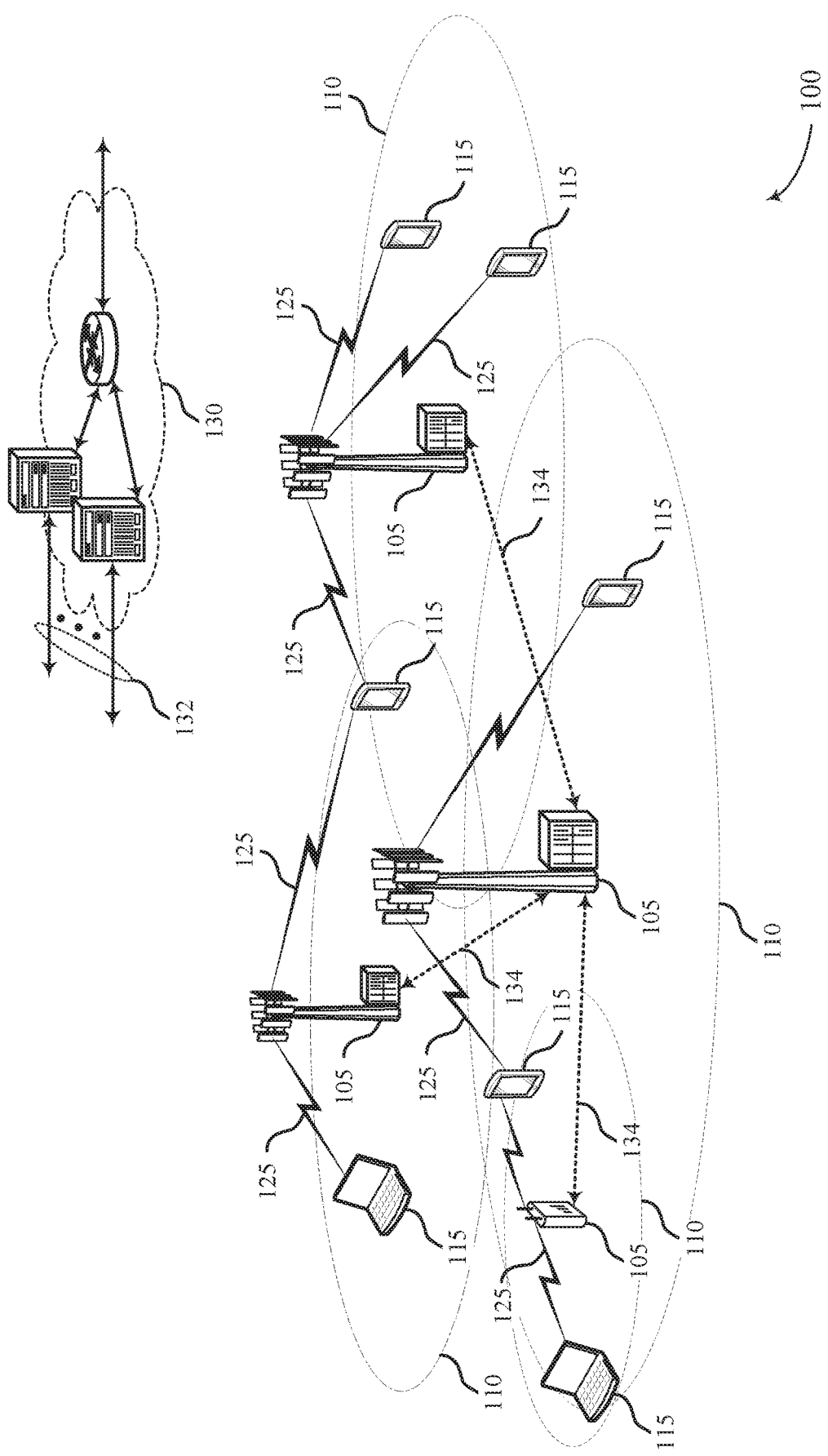
FIG. 1 illustrates an example of a system for wireless communications that supports coefficient indication for channel state information in accordance with aspects of the present disclosure.

In some wireless communications systems (e.g., multiple input-multiple output (MIMO) or multi-user MIMO (MU-MIMO) systems), a user equipment (UE) may report channel state information feedback to a base station for multiple discrete Fourier transform (DFT) beams. The frequency domain of the DFT beams may span a bandwidth part (BWP), which may include one or more sub-bands according to a granularity configured at the UE or the base station. Based on the channel state information feedback, the base station may construct a precoding matrix and may precode transmissions over the multiple DFT beams. In some cases, the UE may report basis subset selection for a set of beams, and the base station may use the basis vectors to determine a precoding matrix for communicating with the UE (e.g., a precoder selected from a linear combination codebook). To reduce the reporting overhead, the UE may report a set of cross layer coefficients, where the cross layer coefficients may be utilized to indicate precoding coefficients that are common across multiple spatial layers. For example, the UE may indicate a set of cross layer coefficients in a report.

According to one or more aspects of the present disclosure, the UE may perform channel state information measurements on reference signal transmissions from the base station. Based on the channel state information measurements, the UE may identify a set of cross layer coefficients associated with a set of spatial layers. For example, the set of cross layer coefficients may include precoding coefficients that are common across the set of spatial layers. In some cases, the UE may determine a number of bits associated with the plurality of basis vectors for the set of beams, and may determine that a subset of the number of bits is associated with the set of cross layer coefficients. In order to transmit the set of cross layer coefficients, the UE may set each bit of the subset of the determined number of bits to one and set a remaining number of bits to zero. In some implementations, the UE may identify a set of precoding coefficients associated with a spatial layer from the set of spatial layers. The set of precoding coefficients associated with the spatial layer may be based on the set of cross layer coefficients. The UE may then transmit the set of cross layer coefficients and the set of precoding coefficients to the base station.

According to one or more aspects of the present disclosure, the base station may receive the set of cross layer coefficients associated with the set of spatial layers from the UE. The set of cross layer coefficients may include precoding coefficients that are common to one or more spatial layers from the set of spatial layers. The base station may then receive a set of precoding coefficients associated with a spatial layer from the set of spatial layers. In some cases, the base station may determine a set of basis vectors based on the set of cross layer coefficients and the set of precoding coefficients. In some examples, the base station may determine a coefficient matrix using the set of basis vectors.

Aspects of the disclosure are initially described in the context of a wireless communications system. Aspects of the disclosure are further illustrated by and described with reference to apparatus diagrams, system diagrams, and flowcharts that relate to coefficient indication for channel state information.

FIG. 1 illustrates an example of a wireless communications system 100 that supports coefficient indication for channel state information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a UE 115 may report a set of cross layer coefficients, where the cross layer coefficients may be utilized to indicate precoding coefficients that are common across multiple spatial layers. For example, the UE 115 may indicate a set of cross layer coefficients in an encoded report. A base station 105 may use the encoded report to determine a precoding matrix for communicating with the UE 115. To reduce the reporting overhead for reporting precoding coefficients for different spatial layers, the UE 115 may transmit a set of cross layer coefficients within a channel state information report.

According to one or more aspects of the present disclosure, the UE 115 may perform channel state information measurements on reference signal transmissions from the base station 105. Based on the channel state information measurements, the UE 115 may identify a set of cross layer coefficients associated with a set of spatial layers. For example, the set of cross layer coefficients may include precoding coefficients that are common across the set of spatial layers. In some cases, the UE 115 may identify a set of precoding coefficients associated with a spatial layer from the set of spatial layers. In some implementations, the set of precoding coefficients associated with the spatial layer may be based on the set of cross layer coefficients. The UE 115 may then transmit the set of cross layer coefficients and the set of precoding coefficients to the base station 105.

According to one or more aspects of the present disclosure, the base station 105 may receive the set of cross layer coefficients associated with the set of spatial layers from the UE 115. In some cases, the set of cross layer coefficients may include precoding coefficients that are common to one or more spatial layers from the set of spatial layers. The base station 105 may then receive a set of precoding coefficients associated with a spatial layer from the set of spatial layers. In some cases, the set of precoding coefficients is based on the set of cross layer coefficients. Upon receiving the set of precoding coefficients, the base station 105 may determine a set of basis vectors based on the set of cross layer coefficients and the set of precoding coefficients. In some examples, the set of basis vectors may be used for determining a coefficient matrix.

Figure 2:
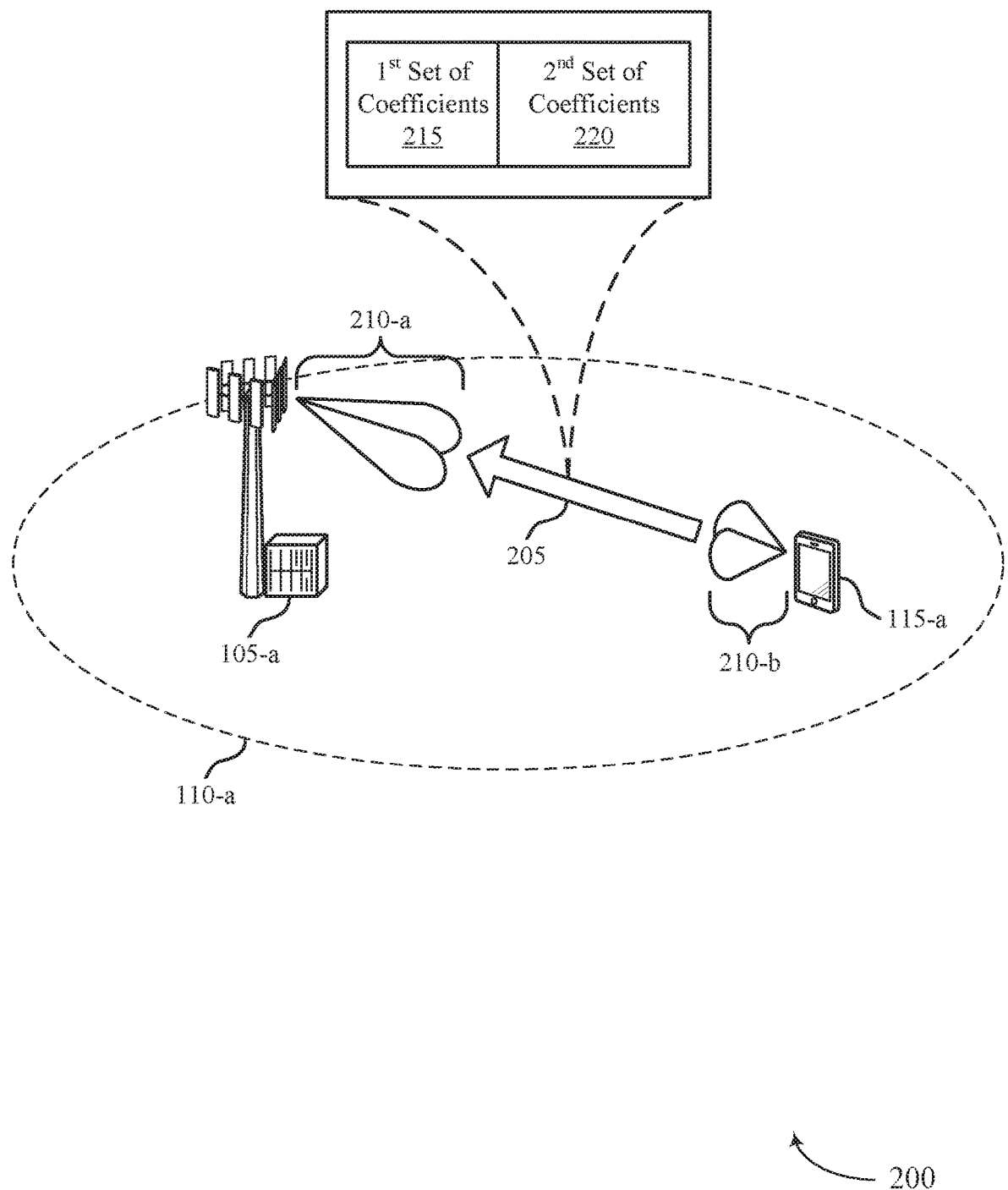
FIG. 2 illustrates an example of a wireless communications system that supports coefficient indication for channel state information in accordance with aspects of the present disclosure.

FIG. 2 illustrates an example of a wireless communications system 200 that supports coefficient indication for channel state information in accordance with aspects of the present disclosure. In some examples, the wireless communications system 200 may implement aspects of wireless communications system 100. The wireless communications system 200 may include base station 105-a and UE 115-a, which may be examples of the corresponding devices described with respect to FIG. 1. Base station 105-a may provide network coverage for geographic coverage area 110-a. The UE 115-a may measure one or more channel state information reference signals from the base station 105-a at one or more antenna ports. The UE 115-a may utilize the channel state information measurements from the one or more antenna ports to determine one or more coefficients corresponding to a precoding matrix W and to generate a bit representation of each coefficient. Each coefficient may be associated with a set of possible coefficient values for different beams, polarities, and layer combinations. In some examples, the base station 105-a may use the bit representation of the coefficients in conjunction with layer, polarity, and/or beam information to calculate a precoding matrix W.

To support MIMO communications between base station 105-a and UE 115-a, the UE 115-a may transmit a feedback to base station 105-a on an uplink channel 205. For example, UE 115-a may transmit a linear combination coefficients matrix as part of a channel state information transmission to base station 105-a. In some cases, the UE 115-a may transmit a linear combination coefficients matrix including one or more linear combination coefficients. For example, the linear combination coefficients may be utilized for precoding and may include amplitude and co-phasing. In some instances, the linear combination coefficients matrix may have dimensions 2L×M, where 2L is a number of beams for channel state information feedback and M is the number of basis vectors for frequency compression per beam. According to one or more existing systems, the UE 115-a may transmit K feedback coefficients using the one or more linear combination coefficients.

More specifically, a UE 115 (e.g., UE 115-a) may select a set of basis vectors for frequency domain compression for a set of beams 210. In some cases, the set of beams 210 may be based on a subset of a set of antenna ports. For example, the number of antenna ports may be configured according to parameters $N_1$ and $N_2$, where the number of antenna ports (e.g., channel state information reference signal ports) may equal $2N_1N_2$. A number of beams L may be configured, and may be a subset of the set of antenna ports, where the number of beams for channel state information feedback may be 2L. The set of basis vectors may compose a coefficient matrix (e.g., a linear combination coefficients matrix) that may be used to determine a precoder for transmission. The UE 115-a may transmit information indicating the set of basis vectors to the base station 105-a, and the base station 105-a may calculate a precoding matrix using the coefficient matrix and pre-configured information (e.g., a spatial domain compression matrix, a frequency domain compression matrix, etc.). The base station 105-a may then select a precoder from a codebook to use for precoding transmissions to the UE 115-a, where the precoder is associated with the calculated precoding matrix.

In some examples, the UE 115-a may transmit the information indicating the set of basis vectors in a channel state information report on the uplink channel 205. This information may contain feedback of $K = \sum_{i=0}^{2L-1} M_i$ basis vectors (e.g., the basis subset selection) for the 2L beams. In some cases, the UE 115-a may use a bitmap to indicate the K feedback coefficients. If the number of basis vectors for frequency compression per beam is large, then the resulting bitmap may also be non-negligible. As an example, if the value of L is 4 and the value of M is 8, then the UE 115-a may use 64 bits to indicate the K feedback coefficients. That is, the size of the bitmap transmitted by the UE 115-a may be 64 bits. Accordingly, to reduce feedback overhead, the UE 115-a may report a set of cross layer coefficients, where the cross layer coefficients may be utilized to indicate precoding coefficients that are common across multiple spatial layers. In some cases, the UE 115-a may perform channel state information measurements on reference signal transmissions, and based on the channel state information measurements, the UE 115-a may identify a set of cross layer coefficients associated with a set of spatial layers. The UE 115-a may then identify a set of precoding coefficients associated with a spatial layer. In some cases, the set of precoding coefficients associated with a spatial layer may be based on the set of cross layer coefficients.

According to one or more aspects of the present disclosure, the UE 115-a may then transmit the set of cross layer coefficients and the set of precoding coefficients to the base station 105-a. In some examples, the UE 115-a may transmit the cross layer coefficients and the precoding coefficients separately (such as encoded as two reports). As described in the example of FIG. 2, the UE 115-a may transmit a first set of coefficients 215 and a second set of coefficients 220, where the first set of coefficients 215 includes a set of cross layer coefficients and the second set of coefficients 220 includes a set of precoding coefficients. Using these coefficients, the UE 115-a may efficiently indicate beam combination coefficients to the base station 105-a.

Additionally, the base station 105-a may receive the set of cross layer coefficients associated with the set of spatial layers from the UE 115-a. The base station 105-a may also receive a set of precoding coefficients associated with a spatial layer from the set of spatial layers. For example, the base station 105-a may receive the first set of coefficients 215 including a set of cross layer coefficients and the second set of coefficients 220 including a set of precoding coefficients. In some cases, the set of cross layer coefficients may include precoding coefficients that are common to one or more spatial layers. Upon receiving the set of precoding coefficients, the base station 105-a may determine a set of basis vectors based on the first set of coefficients 215 (such as the set of cross layer coefficients) and the second set of coefficients 220 (such as the set of precoding coefficients). In some examples, the base station 105-a may determine a coefficient matrix based on the set of basis vectors.

According to one or more additional aspects of the present disclosure, the UE 115-a may perform channel state information measurements on one or more reference signal transmissions from the base station 105-a, and may determine a set of basis vectors for a set of beams based on the channel state information measurements. The UE 115-a may also determine a parameter associated with the set of beams. In some cases, a value of the parameter is based on a number of spatial layers associated with the UE 115-a. The UE 115-a may determine a set of precoding coefficients based on the set of basis vectors and the parameter, and transmit the set of determined precoding coefficients to the base station 105-a. For example, the UE 115-a may determine the set of precoding coefficients according to $K_0 = \lceil \beta \times 2LM \rceil$, where the parameter $\beta$ is selected from a set of predefined values. In some cases, the parameter $\beta$ may be selected from $\{\frac{1}{8}, \frac{1}{4}, \frac{1}{2}, \frac{3}{4}\}$. According to some examples, the UE 115-a may receive the set of predefined values from the base station 105-a. In some cases, a first value of the parameter associated with a first set of spatial layers may be different from a second value of the parameter associated with a second set of spatial layers. In some implementations, the different parameters $\beta$ may be associated with different ranks of the UE 115-a. For example, the parameter $\beta$ may be selected as $\frac{1}{8}$ for a first layer associated with a rank, and the parameter $\beta$ may be selected as $\frac{1}{4}$ for a second layer associated with the rank.

According to one or more aspects of the present disclosure, the base station 105-a may receive a set of precoding coefficients from the UE 115-a. Upon receiving the set of precoding coefficients, the base station 105-a may decode the set of precoding coefficients to obtain a set of basis vectors for a set of beams and the parameter $\beta$. As previously discussed, a value of the parameter $\beta$ may be based on a number of spatial layers associated with the UE 115-a. The base station 105-a may then determine a coefficient matrix based on the set of basis vectors for the set of beams and the parameter $\beta$. In one example, the base station 105-a may determine a set of values associated with the parameter $\beta$. The base station 105-a may determine the set of values as $\{\frac{1}{8}, \frac{1}{4}, \frac{1}{2}, \frac{3}{4}\}$. The base station 105-a may then transmit the set of values to the UE 115-a.

FIG. 3 illustrates an example of a matrix operation 300 that supports coefficient indication for channel state information in accordance with aspects of the present disclosure. In some examples, the matrix operation 300 may implement aspects of wireless communications system 100. The matrix operation 300 may be performed by a wireless device (e.g., a base station 105) to determine a precoding matrix 305, W, based on a spatial domain compression matrix 310, $W_1$, a coefficient matrix 315, $\tilde{W}_2$, and a frequency domain compression matrix 320, $W_f^H$. The precoding matrix 305, W, may be an example of a compressed precoder (e.g., a compressed Type II precoder associated with a Type II high resolution codebook) for NR MIMO enhancement, where the compression is based on a sparsity of both spatial and frequency domain resources. To support the compressed precoder, a UE 115 may transmit a reduced amount of information (such as reduced number of report coefficients)—with a corresponding reduced overhead—to a base station 105 in a channel state information report. Such reduced reporting of coefficients may result in channel state information enhancement for MIMO communications. According to one or more aspects, the base station 105 may determine the precoding matrix 305, W, according to:

$$W = W_1 \tilde{W}_2 W_f^H$$

where the resulting precoding matrix 305, W, has P=$N_{tx}$ rows and $N_3$ columns (e.g., corresponding to the frequency domain dimensions or a number of resource blocks (RBs) or reporting sub-bands). In some cases, $N_{tx}$ may be a number of transmit antennas. As one example, the precoding matrix 305, W, may have P=$2N_1N_2$ rows (e.g., corresponding to the spatial domain dimensions or a number of antenna port combinations) and $N_3$ columns.

As described, the spatial domain compression matrix 310, $W_1$, may be an example of a spatial basis, and may consist of L beams per polarization group, resulting in a total of 2L beams. As such, the spatial domain compression matrix 310, $W_1$, may have dimensions P×2L. The coefficient matrix 315, $\tilde{W}_2$, may alternatively be referred to as a linear combination coefficients matrix and may consist of the linear combination coefficients (e.g., amplitude and co-phasing) for precoding. The coefficient matrix 315, $\tilde{W}_2$, may have dimensions 2L×M, where M is the number of basis vectors for frequency compression per beam. The frequency domain compression matrix 320, $W_f^H$, may consist of the basis vectors used to perform compression in the frequency domain and may have dimensions M×$N_3$. In some alternative embodiments, the coefficient matrix 315, $\tilde{W}_2$, and the frequency domain compression matrix 320, $W_f^H$, may be combined into a single matrix, $W_2$, with dimensions 2L×$N_3$.

In some cases, the spatial domain compression matrix 310, $W_1$, and the frequency domain compression matrix 320, $W_f^H$, may be pre-determined at a base station 105. As such, a UE 115 may not report information for these matrices. Instead, the UE 115 may report the coefficient matrix 315, $\tilde{W}_2$, and the base station 105 may determine a precoder based on the reported coefficient matrix 315 and the pre-configured spatial domain compression matrix 310 and frequency domain compression matrix 320. For example, the base station 105 may perform matrix multiplication as illustrated in the matrix operation 300 to determine a precoding matrix 305 and may select a precoder from a codebook (e.g., a linear combination codebook) based on the calculated precoding matrix 305. In some cases, the base station 105 may store logic for determining the precoder in a codebook closest to (i.e., most similar to) a calculated precoding matrix 305.

More specifically, the wireless devices may perform spatial domain compression using the spatial domain compression matrix 310. In some examples, the base station 105 and the UE 115 may support P spatial dimensions, where P is determined based on the number of transmit antenna ports for communication at the base station 105. In some cases, P may be equal to $N_{tx}$, and may depend on configured dimensions $N_1$ and $N_2$ for the antenna ports (i.e., P=$2N_1N_2$). The spatial domain compression matrix 310 may define L spatial domain basis vectors mapped to two polarizations, resulting in a total of 2L selected spatial domain basis vectors. As such, the spatial domain compression matrix 310 may be defined as:

$$W_1 = \begin{bmatrix} v_0 v_1 \ldots v_{L-1} & 0 \\ 0 & v_0 v_1 \ldots v_{L-1} \end{bmatrix}$$

where $\{v_i\}_{i=0}^{L-1}$ are $N_1 N_2 \times 1$ orthogonal discrete Fourier transform (DFT) vectors.

The wireless devices may perform frequency domain compression using the frequency domain compression matrix 320. The base station 105 and the UE 115 may support $N_3$ frequency dimensions (e.g., frequency granularity, a number of RBs, sets of RBs, sub-bands, etc.). The frequency domain compression matrix 320 may define $M_i$ frequency domain basis vectors per beam, i. As such, the frequency domain compression matrix 320 may be defined as:

$$W_f = [W_f(0), \ldots, W_f(2L-1)]$$

where $$W_f(i) = [f_{k_{i,0}} f_{k_{i,1}} \ldots f_{k_{i,M_i-1}}] \text{ and } \{f_{k_{i,m}}\}_{m=0}^{M_i-1}$$

are $M_i$ orthogonal DFT vectors of size $N_3 \times 1$ for the spatial domain components i=0, ..., 2L−1. This frequency domain compression matrix 320 may allow a UE 115 to compress precoder frequency domain reporting from the $N_3$ frequency domain dimensions to the M basis vectors, reducing the reporting overhead.

The linear combination coefficients for a layer may be defined in the coefficient matrix 315, $\tilde{W}_2$, which may be composed of K=2LM linear combination coefficients (e.g., for common basis vectors) or K=$\Sigma_{i=0}^{2L-1} M_i$ linear combination coefficients (e.g., for independent basis vectors). Due to the spatial domain and frequency domain compression, a UE 115 may report the linear combination coefficients for a base station 105 to determine the corresponding precoding matrix 305. In some cases, the UE 115 may report the linear combination coefficients K using a bitmap of 2L×M bits. For example, the bitmap of 2L×M bits may include K non-zero coefficients indicating the linear combination coefficients. The base station 105 may receive the reported linear combination coefficients K, and may determine the coefficient matrix 315, $\tilde{W}_2$. This reporting may support Type II overhead reduction (e.g., a reduction in channel state information payload for reporting the basis subset selection).

However, simply reporting a bitmap of 2L×M bits to indicate the K feedback coefficients may still result in a large overhead. For example, if the number of basis vectors for frequency compression per beam is large, then the resulting bitmap may also be non-negligible. If the value of L is 4 and the value of M is 8, then the UE 115 may use 2L×M=64 bits to indicate the K feedback coefficients. That is, the size of the bitmap may be 64 bits. To allow overhead savings, the UE 115 may report a set of cross layer coefficients, where the cross layer coefficients may be utilized to indicate precoding coefficients (such as K feedback coefficients) that are common across multiple spatial layers. In one example, the UE 115 may report a set of cross layer coefficients using 2L×M bits, where the set of cross layer coefficients may include $K_{cr}$ non-zero coefficients indicating feedback coefficients for one or more spatial layers. In some cases, the $K_{cr}$ non-zero coefficients may include an union of all feedback coefficients used for all spatial layers.

In some cases, the UE 115 may perform channel state information measurements on reference signal transmissions received from the base station 105. In some cases, based on the channel state information measurements, the UE 115 may identify a set of cross layer coefficients associated with a set of spatial layers. As previously discussed, the set of cross layer coefficients may include 2L×M bits. For example, the UE 115 may determine a set of basis vectors for a set of beams (such as M basis vectors and 2L beams), and may determine a number of bits associated with the set of basis vectors for the set of beams (such as 2L×M bits). According to one or more examples, the UE 115 may transmit the set of cross layer coefficients based on the number of bits. In some examples, the set of cross layer coefficients may be transmitted using a subset of the determined number of bits. That is, the UE 115 may include $K_{cr}$ non-zero coefficients in the set of cross layer coefficients. The $K_{cr}$ non-zero coefficients may therefore occupy a subset of the 2L×M bits.

In some examples, the UE 115 may set each bit of the subset of the determined number of bits to one (such as $K_{cr}$ bits are set to one) and may set a remaining number of bits to zero. In some cases, the $K_{cr}$ bits among the 2L×M bits may indicate one or more locations where the cross layer coefficients are transmitted. In some cases, the $K_{cr}$ non-zero coefficients may be determined by the UE 115. Alternatively, the $K_{cr}$ non-zero coefficients may be pre-defined by the base station 105. In the case where the $K_{cr}$ non-zero coefficients are pre-defined by the base station 105, the UE 115 may receive an indication of the set of cross layer coefficients from the base station 105. In some examples, the UE 115 may identify the set of cross layer coefficients based on the received indication. In some examples, the set of cross layer coefficients may be based on at least one of a number of basis vectors, a number of beams, a number of frequency domain dimensions, or a combination thereof.

The UE 115 may then identify a set of precoding coefficients associated with a spatial layer. In some cases, the set of precoding coefficients associated with a spatial layer may be based on the set of cross layer coefficients. In some cases, the UE 115 may use $K_{cr}$ length bitmap to indicate the K feedback coefficients for each layer. The UE 115 may then transmit the set of cross layer coefficients and the set of precoding coefficients to the base station 105. In some examples, a first precoding coefficient associated with a first spatial layer may be different from a second precoding coefficient associated with a second spatial layer. In some examples, the set of cross layer coefficients and the set of precoding coefficients may be same across a first polarization and a second polarization. In some examples, the set of cross layer coefficients and the set of precoding coefficients may be different across a first polarization and a second polarization. In some cases, one or more cross layer coefficients may include one or more precoding coefficients associated with two or more spatial layers. In some cases, a first indication may include the indication of the set of cross layer coefficients and a second indication may include the indication of the set of precoding coefficients. In some implementations, the first indication and the second indication may both be same across different polarizations. In some cases, the first indication may be same across different polarizations and the second indication may be different across different polarizations. Alternatively, the first indication and the second indication may both be different across different polarizations.

The UE 115 may transmit the cross layer coefficients and the precoding coefficients separately (such as encoded as two reports). In some implementations, the UE 115 may encode the set of cross layer coefficients associated with the set of spatial layers to obtain a first encoded report. The UE 115 may then encode the set of precoding coefficients associated with the spatial layer to obtain a second encoded report. In some cases, the UE 115 may transmit the set of cross layer coefficients and the set of precoding coefficients by transmitting the first encoded report and the second encoded report. Additionally or alternatively, the UE 115 may encode the set of cross layer coefficients associated with the set of spatial layers and the set of precoding coefficients associated with the spatial layer from the set of spatial layers to obtain an encoded report. The UE 115 may transmit the set of cross layer coefficients and the set of precoding coefficients by transmitting the encoded report. In one example, the set of cross layer coefficients associated with the set of spatial layers may be indicated as an option in the second encoded report. In some cases, the UE 115 may transmit a channel state information report including the set of cross layer coefficients and the set of precoding coefficients. Using these coefficients, the UE 115 may efficiently indicate beam combination coefficients to the base station 105.

According to one or more aspects of the present disclosure, the base station 105 may receive the set of cross layer coefficients associated with the set of spatial layers from the UE 115. The base station 105 may receive a set of precoding coefficients associated with a spatial layer from the set of spatial layers. As previously discussed, the set of cross layer coefficients may include precoding coefficients that are common to one or more spatial layers. Upon receiving the set of precoding coefficients, the base station 105 may determine a set of basis vectors based on set of cross layer coefficients and the set of precoding coefficients. In some examples, the base station 105 may determine a coefficient matrix based on the set of basis vectors.

According to one or more additional aspects of the present disclosure, the UE 115 may perform channel state information measurements, and may determine a set of basis vectors for a set of beams based on the channel state information measurements (such as 2LM). In some cases, the UE 115 may determine a parameter β associated with the set of beams. In some cases, a value of the parameter may be based on a number of spatial layers associated with the UE 115. In some case, the value of the parameter may be predefined, and the UE 115 may select the value of the parameter from a set of predefined values. In some cases, the parameter β may be selected from {⅛, ¼, ½, ¾}. In some examples, the UE 115 may determine a set of precoding coefficients based on the set of basis vectors and the parameter, and transmit the set of determined precoding coefficients to the base station 105. For example, the UE 115-*a* may determine the set of precoding coefficients according to $K_0 = [\beta \times 2LM]$. In some examples, the UE 115 may receive the set of predefined values (such as {⅛, ¼, ½, ¾}) from the base station 105. In some cases, a first value of the parameter β associated with a first set of spatial layers may be different from a second value of the parameter β associated with a second set of spatial layers.

Additionally or alternatively, the base station 105 may receive a set of precoding coefficients from the UE 115, and may decode the set of precoding coefficients to obtain a set of basis vectors for a set of beams and the parameter β. As previously discussed, a value of the parameter β may be based on a number of spatial layers associated with the UE 115-*a*. The base station 105-*a* may then determine a coefficient matrix based on the set of basis vectors for the set of beams and the parameter β.

Figure 4:
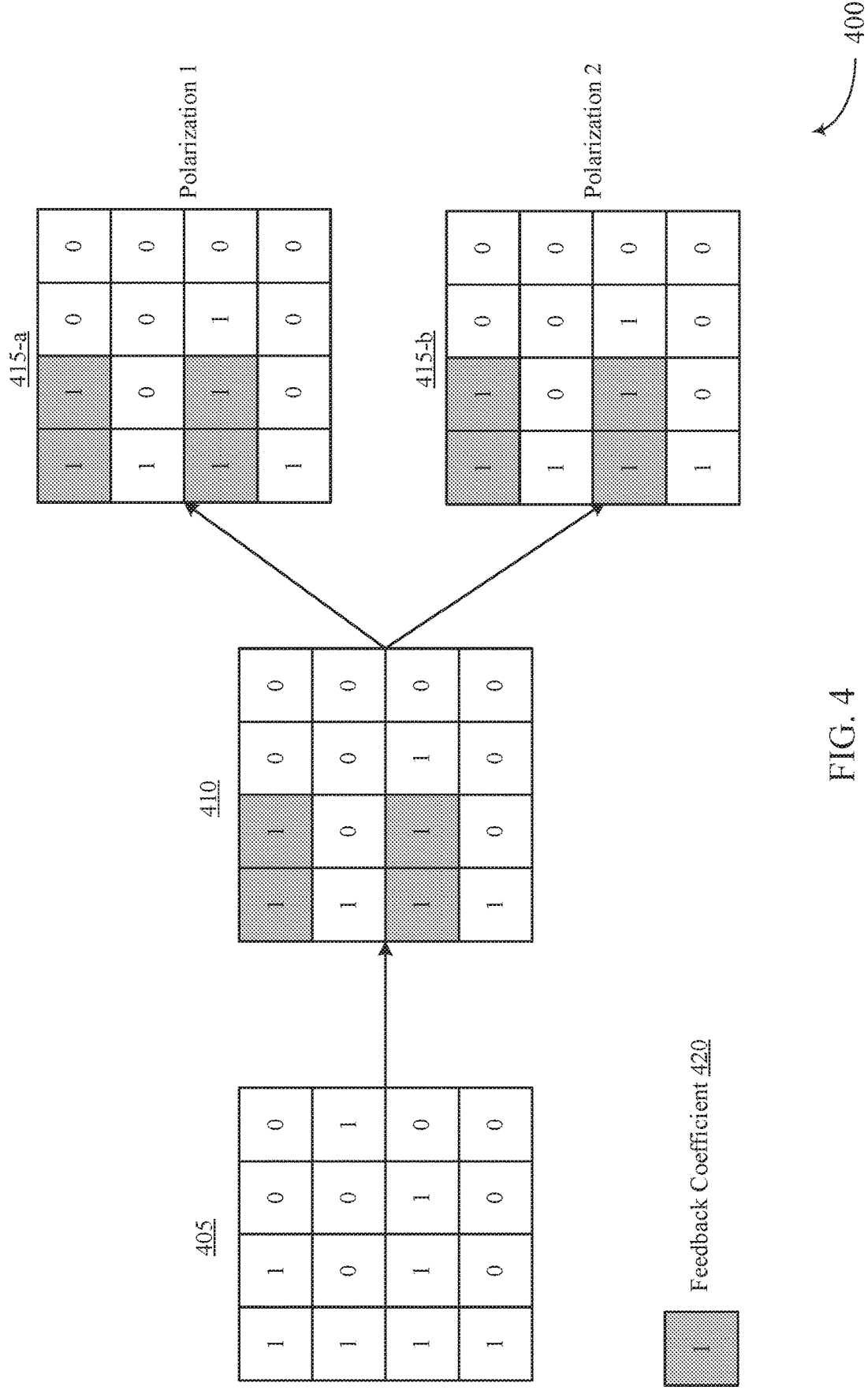
FIG. 4 illustrates an example of a coefficient indication that supports coefficient indication for channel state information in accordance with aspects of the present disclosure.

FIG. 4 illustrates an example of a coefficient indication 400 that supports coefficient indication for channel state information in accordance with aspects of the present disclosure. In some examples, coefficient indication 400 may implement aspects of wireless communications system 100. The coefficient indication 400 may correspond to a scenario where the first indication including the set of cross layer coefficients and the second indication including the set of precoding coefficients are same across different polarizations.

The coefficient indication 400 may include the first indication 405 including the set of cross layer coefficients and the second indication 410 including the set of precoding coefficients. In some cases, the first indication 405 may be referred to as a first stage indication and the second indication 410 may be referred to as a second stage indication. The example of FIG. 4 also includes the second stage indications for each polarity. For example, the second stage indication 415-a may be for a first polarity and the second stage indication 415-b may be for a second polarity. As described in FIG. 4, the second stage indication 415-a for the first polarity and the second stage indication 415-b for the second polarity may be same. In the coefficient indication 400, a UE 115 may identify the first indication 405 including the set of cross layer coefficients and the second indication 410 including the set of precoding coefficients according to the methods described in FIGS. 1 through 3.

The UE 115 may perform channel state information measurements on reference signal transmissions received from a base station 105. In some cases, the UE 115 may identify a set of cross layer coefficients associated with a set of spatial layers based on the channel state information measurements. In the example of FIG. 4, the value of L may be 4 and the value of M may be 4. The set of cross layer coefficients may include 2L×M bits. As described in the example of FIG. 4, the first indication 405 including the set of cross layer coefficients has 16 bits. In some examples, the UE 115 may transmit the set of cross layer coefficients using a subset of the determined number of bits. That is, the UE 115 may include $K_{cr}$ non-zero coefficients in the set of cross layer coefficients. The $K_{cr}$ non-zero coefficients may therefore occupy a subset of the 2L×M bits. In the example of FIG. 4, the UE 115 may include $K_{cr}$=8. That is, the UE 115 transmits 8 ones using the first indication 405 including the set of cross layer coefficients. The UE 115 may set each bit of the subset of the determined number of bits to one and may set a remaining number of bits to zero. As described in the example of FIG. 4, $K_{cr}$ bits (such as 8 bits) among 16 bits are set to one. In some cases, the $K_{cr}$ bits among the 2L×M bits may indicate one or more locations where the cross layer coefficients are transmitted.

The UE 115 may then identify the second indication 410 including the set of precoding coefficients associated with a spatial layer. In some cases, the set of precoding coefficients associated with the spatial layer may be based on the set of cross layer coefficients. That is, the UE 115 may use $K_{cr}$ length bitmap to indicate the K feedback coefficients 420 for each layer. In the example of FIG. 4, the UE 115 uses 8 bits to indicate the K feedback coefficients 420 for each layer. For example, the UE 115 may transmit 4 feedback coefficients 420 for each spatial layer. The feedback coefficients 420 may be transmitted at a location indicated by the $K_{cr}$ non-zero coefficients. In the example of FIG. 4, the second stage indication 415-a associated with a first polarity is same as the second stage indication 415-b associated with a second polarity.

Figure 5A:
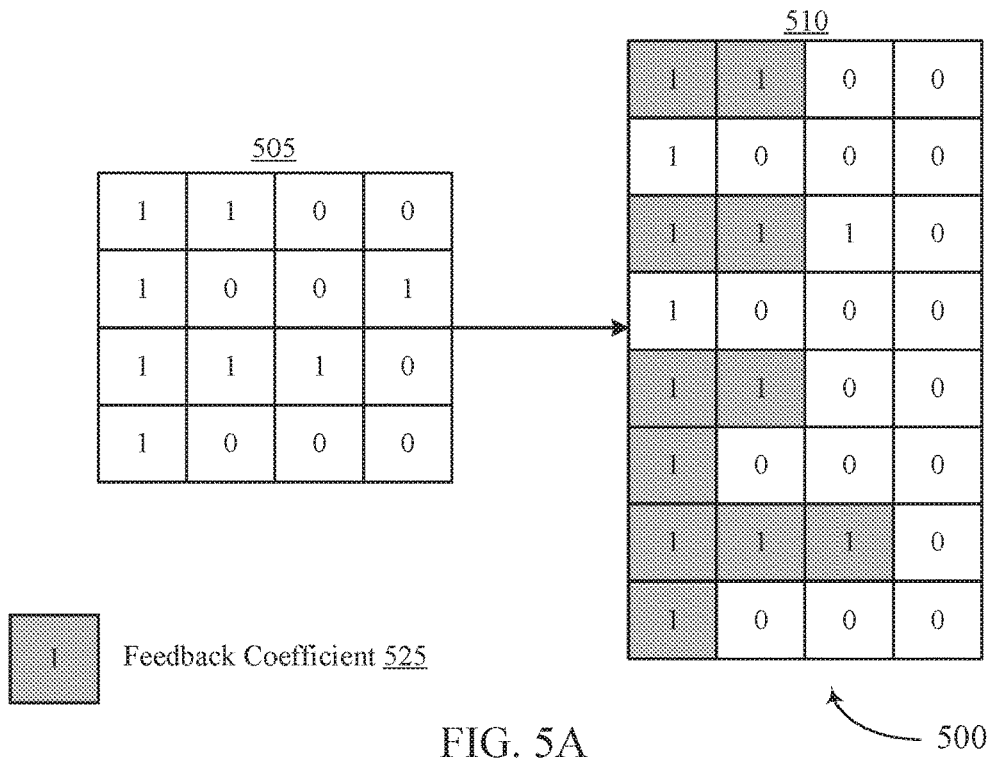
FIGS. 5A and 5B illustrate examples of coefficient indications that support coefficient indication for channel state information in accordance with aspects of the present disclosure.
Figure 5B:
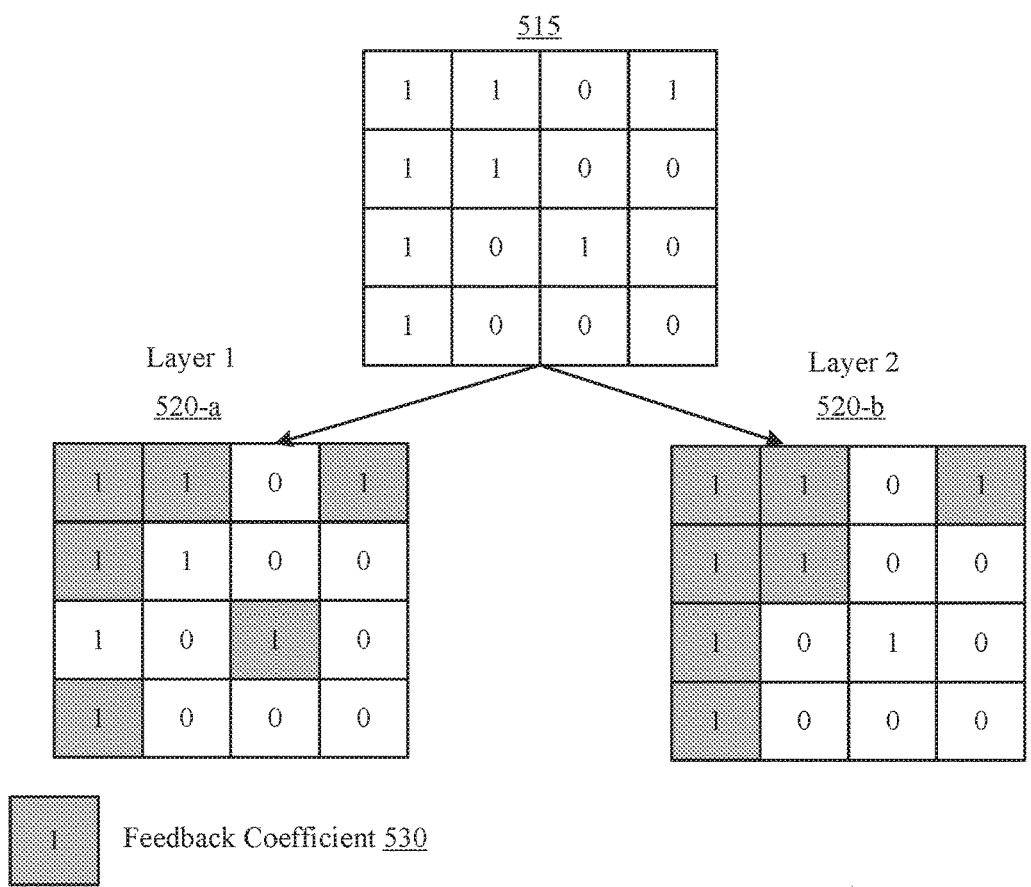

FIGS. 5A and 5B illustrate examples of a coefficient indication 500 and a coefficient indication 550 that supports coefficient indication for channel state information in accordance with aspects of the present disclosure. In some examples, the coefficient indication 500 and the coefficient indication 550 may implement aspects of wireless communications system 100. The coefficient indication 500 may correspond to a scenario where the first indication including the set of cross layer coefficients is same across different polarizations, and the second indication including the set of precoding coefficients is different across different polarizations. The coefficient indication 550 may correspond to a scenario where the first indication including the set of cross layer coefficients and the second indication including the set of precoding coefficients are different across different polarizations The coefficient indication 500 may include the first indication 505 including the set of cross layer coefficients and the second indication 510 including the set of precoding coefficients. In some cases, the first indication 505 may be referred to as a first stage indication and the second indication 510 may be referred to as a second stage indication. In the example of FIG. 5A, a UE 115 may identify the first indication 505 including the set of cross layer coefficients and the second indication 510 including the set of precoding coefficients according to the methods described in FIGS. 1 through 3. The UE 115 may identify a set of cross layer coefficients associated with a set of spatial layers based on performing channel state information measurements. In the example of FIG. 5A, the value of L may be 4 and the value of M may be 4. The set of cross layer coefficients may be determined to include 16 bits. In some examples, the UE 115 may transmit the set of cross layer coefficients using a subset of the determined number of bits. The UE 115 may include $K_{cr}$ non-zero coefficients in the set of cross layer coefficients. In this example, the non-zero coefficients may include $K_{cr}$=8 bits. That is, the UE 115 may transmit 8 ones using the first indication 505 including the set of cross layer coefficients. The UE 115 may set each of the $K_{cr}$ bits (such as 8 bits) among the 16 bits to one.

According to the example of FIG. 5A, the UE 115 may identify the second indication 510 including the set of precoding coefficients associated with one or more spatial layers. In some cases, the set of precoding coefficients associated with the spatial layer may be based on the set of cross layer coefficients. The UE 115 may use $K_{cr}$ length bitmap to indicate the K feedback coefficients 525 for each layer. In the example of FIG. 5A, the UE 115 uses 8 bits to indicate the K feedback coefficients 525 for each layer, and uses 16 bits for each layer. In the example of FIG. 5A, the first indication 505 including the set of cross layer coefficients is same across different polarizations, and the second indication 510 including the set of precoding coefficients is different across different polarizations.

Referring to FIG. 5B, the coefficient indication 550 may include the first indication 515 including the set of cross layer coefficients and the second indication 520 including the set of precoding coefficients. In some cases, the first indication 515 may be referred to as a first stage indication and the second indication 520 may be referred to as a second stage indication. In one example, the second stage indication 520-a may be for a first layer and the second stage indication 520-b may be for a second layer. As previously discussed, a UE 115 may identify the first indication 515 including the set of cross layer coefficients and the second indication 520 including the set of precoding coefficients according to the methods described in FIGS. 1 through 3. In the example of FIG. 5B, the value of L may be 2 and the value of M may be 4. The set of cross layer coefficients may include 16 bits. In some examples, the UE 115 may transmit the set of cross layer coefficients using a subset of the 16 bits. The UE 115 may include $K_{cr}$ non-zero coefficients in the set of cross layer coefficients. In this example, the non-zero coefficients may include $K_{cr}$=8 bits. That is, the UE 115 may set each of the $K_{cr}$ bits (such as 8 bits) among the 16 bits to one. The UE 115 may also identify the second indication 520 including the set of precoding coefficients associated with one or more spatial layers. As describe din FIG. 5B, the second indication 520-a may be associated with a first spatial layer and the second indication 520-b may be associated with a second spatial layer. In the example of FIG. 5B, the UE 115 uses 8 bits to indicate the K feedback coefficients 525 for each layer, and uses 8 bits for each layer. In the example of FIG. 5B, the first indication 515 including the set of cross layer coefficients and the second indication 520 including the set of precoding coefficients are different across different polarizations.

Figure 6:
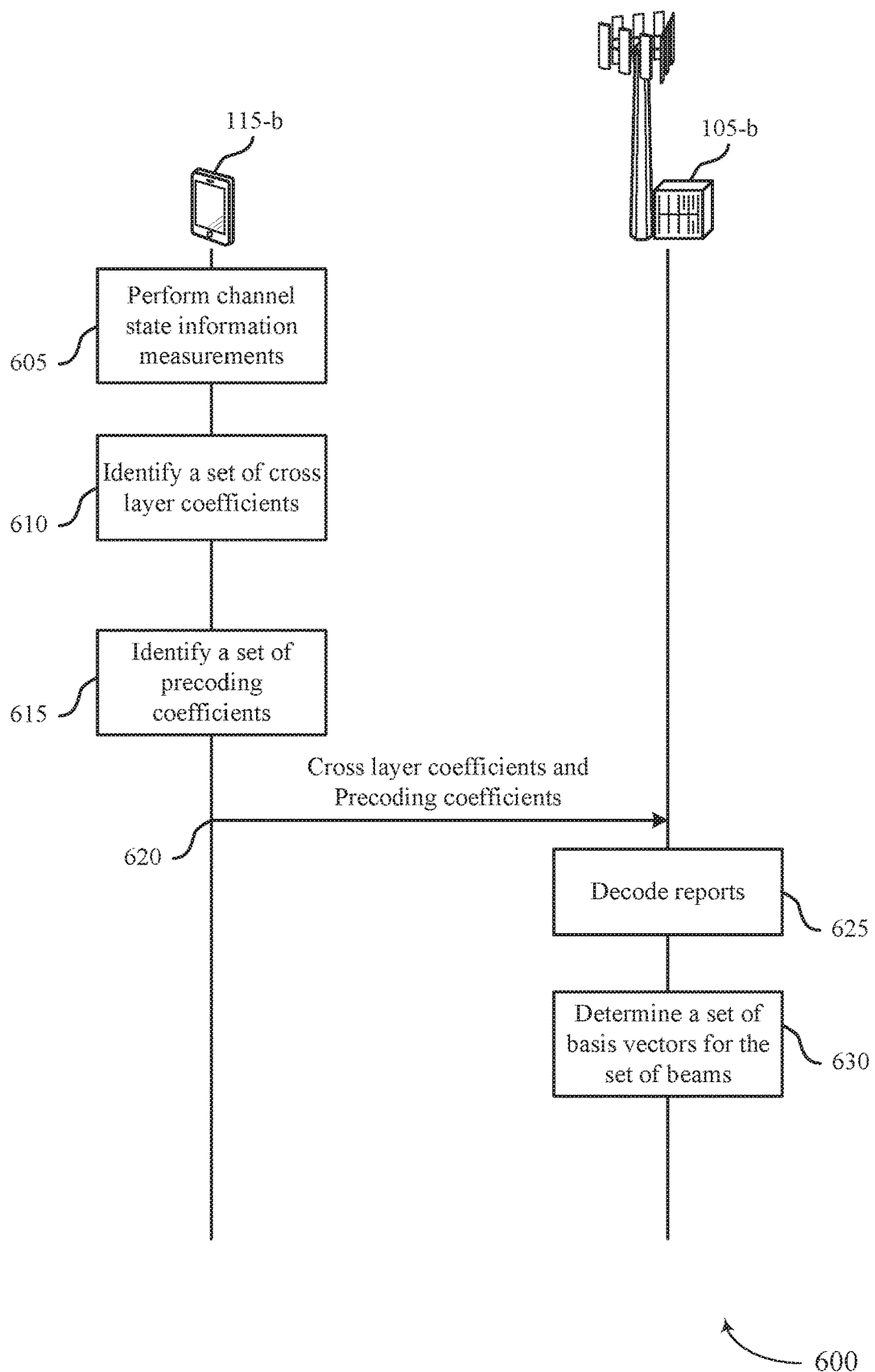
FIG. 6 illustrates an example of a process flow that supports coefficient indication for channel state information in accordance with aspects of the present disclosure.

FIG. 6 illustrates an example of a process flow 600 that supports coefficient indication for channel state information in accordance with aspects of the present disclosure. In some examples, the process flow 600 may implement aspects of wireless communications system 100. The process flow 600 may include a base station 105-b and a UE 115-b, which may be examples of the corresponding devices described with reference to FIGS. 1 and 2. To allow overhead savings, the UE 115-b may report a set of cross layer coefficients, where the cross layer coefficients may be utilized to indicate precoding coefficients (such as K feedback coefficients) that are common across multiple spatial layers. Alternative examples of the following may be implemented, where some steps are performed in a different order than described or are not performed at all. In some cases, steps may include additional features not mentioned below, or further steps may be added.

At 605, UE 115-b may perform channel state information measurements on one or more reference signal transmissions from a base station 105-b. In some cases, the UE 115-b may receive the reference signal transmissions from the base station 105-b, and may perform the channel state information measurements.

At 610, UE 115-b may identify a set of cross layer coefficients associated with a set of spatial layers. In some implementations, the UE 115-b may identify the set of cross layer coefficients based on the channel state information measurements. In some cases, the UE 115-b may identify $K_{cr}$ non-zero coefficients in the set of cross layer coefficients.

At 615, UE 115-b may identify a set of precoding coefficients associated with a spatial layer from the set of spatial layers. In some implementations, the UE 115-b may identify the set of precoding coefficients based on the set of cross layer coefficients. In some examples, a first precoding coefficient associated with a first spatial layer may be different from a second precoding coefficient associated with a second spatial layer. In some cases, the set of cross layer coefficients and the set of precoding coefficients are same across a first polarization and a second polarization. Additionally or alternatively, the set of cross layer coefficients and the set of precoding coefficients are different across a first polarization and a second polarization.

At 620, UE 115-b may transmit the set of cross layer coefficients and the set of precoding coefficients to the base station 105-b. For example, UE 115-b may encode the set of cross layer coefficients associated with the set of spatial layers to obtain a first encoded report, and may encode the set of precoding coefficients associated with the spatial layer from the set of spatial layers to obtain a second encoded report. The UE 115-b may then transmit the first encoded report and the second encoded report to the base station 105-b. According to one or more examples, the UE 115-b may encode the set of cross layer coefficients associated with the set of spatial layers and the set of precoding coefficients associated with the spatial layer from the set of spatial layers to obtain an encoded report. The UE 115-b then transmits the encoded report to the base station 105-b.

The base station 105-b may receive the set of cross layer coefficients and the set of precoding coefficients from the UE 115-b. In one example, the base station 105-b may receive the first and second encoded reports from the UE 115-b.

At 625, base station 105-b may decode a first encoded report to obtain the set of cross layer coefficients associated with the set of spatial layers. The base station 105-b may further decode a second encoded report to obtain the set of precoding coefficients associated with the spatial layer from the set of spatial layers.

At 630, base station 105-b may determine a plurality of basis vectors based on the set of cross layer coefficients and the set of precoding coefficients. In some cases, the base station 105-b may use the plurality of basis vectors to determine a coefficient matrix.

Figure 7:
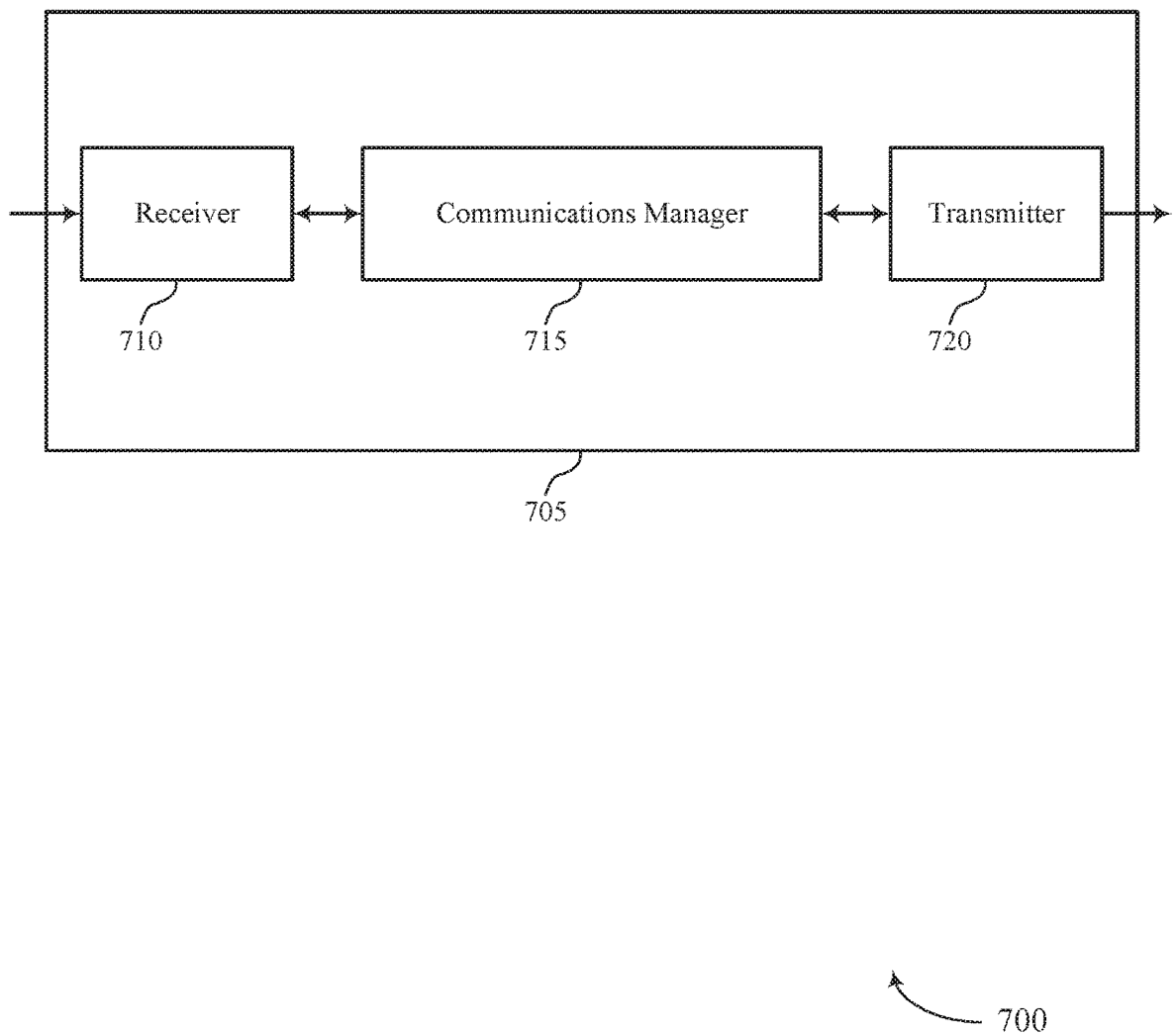
FIGS. 7 and 8 show block diagrams of devices that support coefficient indication for channel state information in accordance with aspects of the present disclosure.

FIG. 7 shows a block diagram 700 of a device 705 that supports coefficient indication for channel state information in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to coefficient indication for channel state information, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may perform channel state information measurements on one or more reference signal transmissions from a base station, identify, based on the channel state information measurements, a set of cross layer coefficients associated with a set of spatial layers, identify, based on the set of cross layer coefficients, a set of precoding coefficients associated with a spatial layer from the set of spatial layers, and transmit the set of cross layer coefficients and the set of precoding coefficients to the base station. The communications manager 715 may also perform channel state information measurements on one or more reference signal transmissions from a base station, determine, based on the channel state information measurements, a set of basis vectors for a set of beams and a parameter, where a value of the parameter is based on a number of spatial layers associated with the UE, determine a set of precoding coefficients based on the set of basis vectors and the parameter, and transmit the set of precoding coefficients to the base station. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
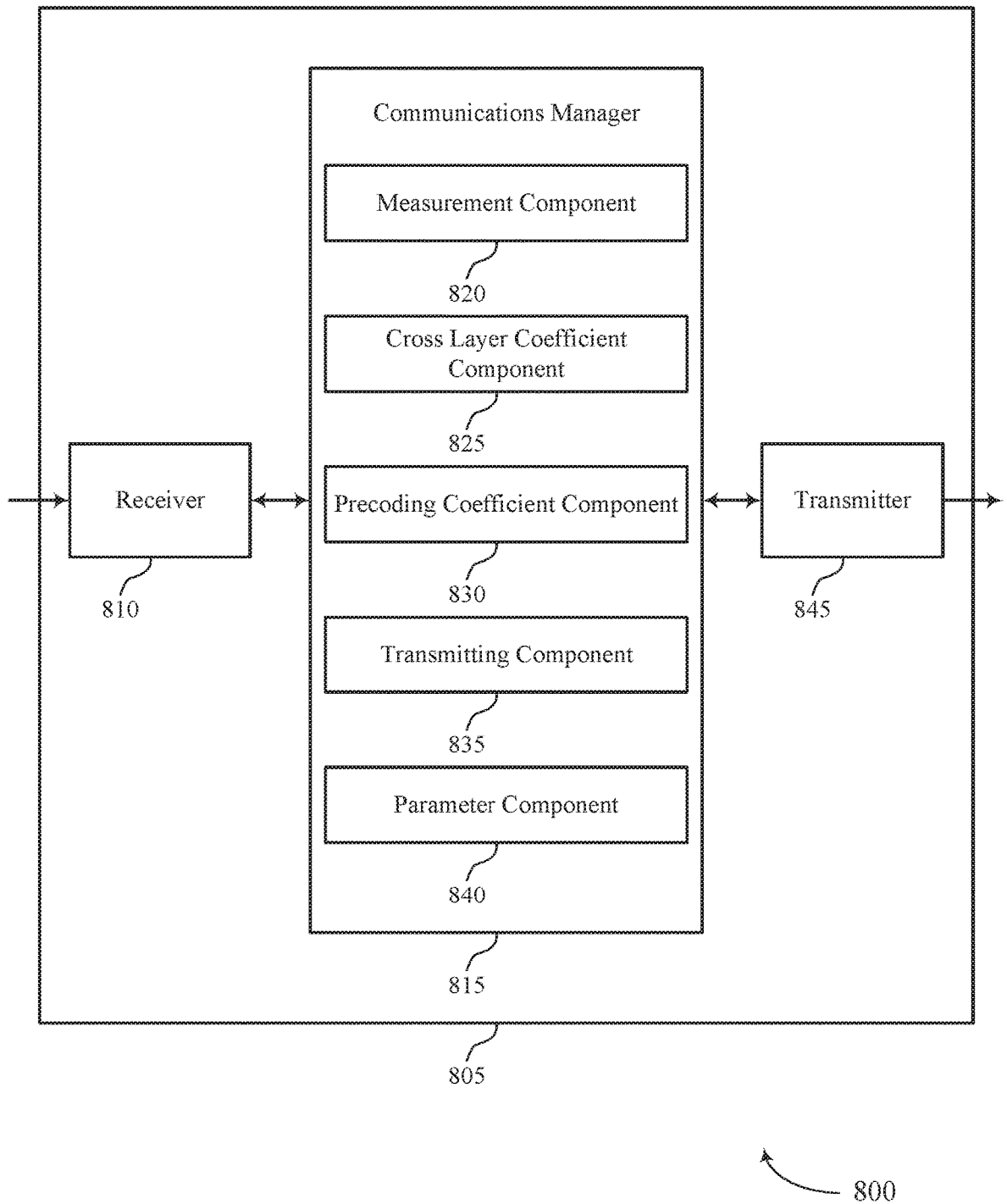

FIG. 8 shows a block diagram 800 of a device 805 that supports coefficient indication for channel state information in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to coefficient indication for channel state information, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a measurement component 820, a cross layer coefficient component 825, a precoding coefficient component 830, a transmitting component 835, and a parameter component 840. The communications manager 815 may be an example of aspects of the communications manager 1010 described herein.

The measurement component 820 may perform channel state information measurements on one or more reference signal transmissions from a base station. The cross layer coefficient component 825 may identify, based on the channel state information measurements, a set of cross layer coefficients associated with a set of spatial layers. The precoding coefficient component 830 may identify, based on the set of cross layer coefficients, a set of precoding coefficients associated with a spatial layer from the set of spatial layers. The transmitting component 835 may transmit the set of cross layer coefficients and the set of precoding coefficients to the base station.

The measurement component 820 may perform channel state information measurements on one or more reference signal transmissions from a base station. The parameter component 840 may determine, based on the channel state information measurements, a set of basis vectors for a set of beams and a parameter, where a value of the parameter is based on a number of spatial layers associated with the UE. The precoding coefficient component 830 may determine a set of precoding coefficients based on the set of basis vectors and the parameter. The transmitting component 835 may transmit the set of precoding coefficients to the base station.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
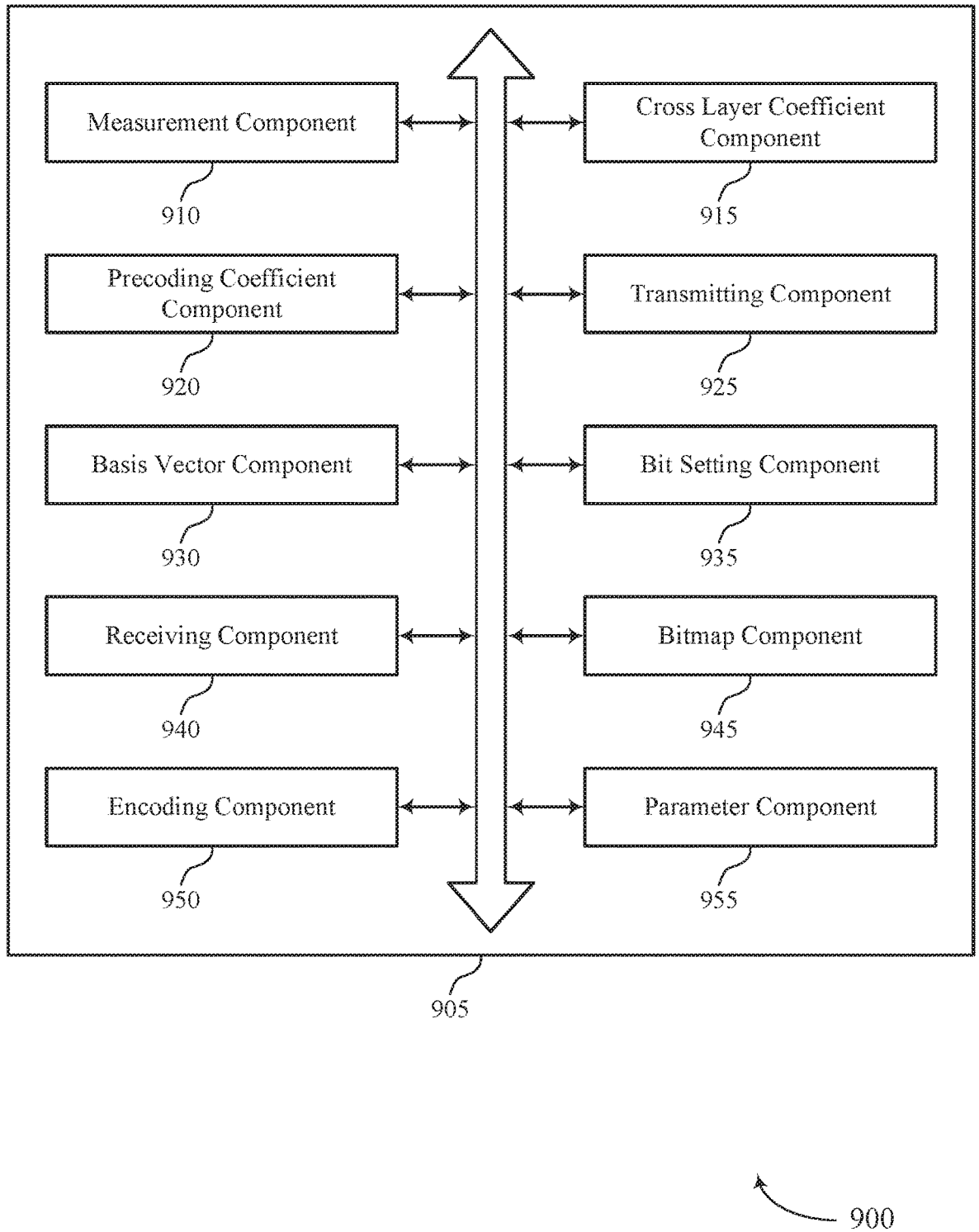
FIG. 9 shows a block diagram of a communications manager that supports coefficient indication for channel state information in accordance with aspects of the present disclosure.

FIG. 9 shows a block diagram 900 of a communications manager 905 that supports coefficient indication for channel state information in accordance with aspects of the present disclosure. The communications manager 905 may be an example of aspects of a communications manager 715, a communications manager 815, or a communications manager 1010 described herein. The communications manager 905 may include a measurement component 910, a cross layer coefficient component 915, a precoding coefficient component 920, a transmitting component 925, a basis vector component 930, a bit setting component 935, a receiving component 940, a bitmap component 945, an encoding component 950, and a parameter component 955. Each of these modules may communicate, directly or indirectly, with one another (e.g., via one or more buses).

The measurement component 910 may perform channel state information measurements on one or more reference signal transmissions from a base station. In some examples, the measurement component 910 may perform channel state information measurements on one or more reference signal transmissions from a base station.

The cross layer coefficient component 915 may identify, based on the channel state information measurements, a set of cross layer coefficients associated with a set of spatial layers. In some cases, the set of cross layer coefficients and the set of precoding coefficients are same across a first polarization and a second polarization. In some cases, the set of cross layer coefficients and the set of precoding coefficients are different across a first polarization and a second polarization. In some cases, one or more cross layer coefficients includes one or more precoding coefficients associated with two or more spatial layers.

The precoding coefficient component 920 may identify, based on the set of cross layer coefficients, a set of precoding coefficients associated with a spatial layer from the set of spatial layers. In some examples, the precoding coefficient component 920 may determine a set of precoding coefficients based on the set of basis vectors and the parameter. In some cases, a first precoding coefficient associated with a first spatial layer is different from a second precoding coefficient associated with a second spatial layer.

The transmitting component 925 may transmit the set of cross layer coefficients and the set of precoding coefficients to the base station. In some examples, the transmitting component 925 may transmit the set of precoding coefficients to the base station. In some examples, the transmitting component 925 may transmit a channel state information report including the set of cross layer coefficients and the set of precoding coefficients.

The parameter component 955 may determine, based on the channel state information measurements, a set of basis vectors for a set of beams and a parameter, where a value of the parameter is based on a number of spatial layers associated with the UE. In some cases, a first value of the parameter associated with a first set of spatial layers is different from a second value of the parameter associated with a second set of spatial layers.

The basis vector component 930 may determine, based on the channel state information measurements, a set of basis vectors for a set of beams. In some examples, the basis vector component 930 may determine a number of bits associated with the set of basis vectors for the set of beams, where transmitting the set of cross layer coefficients is based on the number of bits. In some cases, the set of cross layer coefficients is transmitted using a subset of the determined number of bits. The bit setting component 935 may set each bit of the subset of the determined number of bits to one and setting a remaining number of bits to zero, where the subset of the determined number of bits indicates one or more locations of the set of cross layer coefficients.

The receiving component 940 may receive, from the base station, an indication of the set of cross layer coefficients, where identifying the set of cross layer coefficients is based on the received indication. In some examples, the receiving component 940 may receive a set of predefined values associated with the parameter, where determining the parameter is based on selecting a predefined value from the set of predefined values. In some cases, the set of cross layer coefficients is based on at least one of a number of basis vectors, a number of beams, a number of frequency domain dimensions, or a combination thereof.

The bitmap component 945 may determine a number of bits associated with the set of cross layer coefficients. In some examples, the bitmap component 945 may transmit, to the base station, a bitmap indicating the set of precoding coefficients associated with the spatial layer from the set of spatial layers, where a length of the bitmap is based on the number of bits associated with the set of cross layer coefficients. The encoding component 950 may encode the set of cross layer coefficients associated with the set of spatial layers to obtain a first encoded report. In some examples, encoding the set of precoding coefficients associated with the spatial layer from the set of spatial layers to obtain a second encoded report, where transmitting the set of cross layer coefficients and the set of precoding coefficients includes transmitting the first encoded report and the second encoded report. In some examples, encoding the set of cross layer coefficients associated with the set of spatial layers and the set of precoding coefficients associated with the spatial layer from the set of spatial layers to obtain an encoded report, where transmitting the set of cross layer coefficients and the set of precoding coefficients includes transmitting the encoded report.

Figure 10:
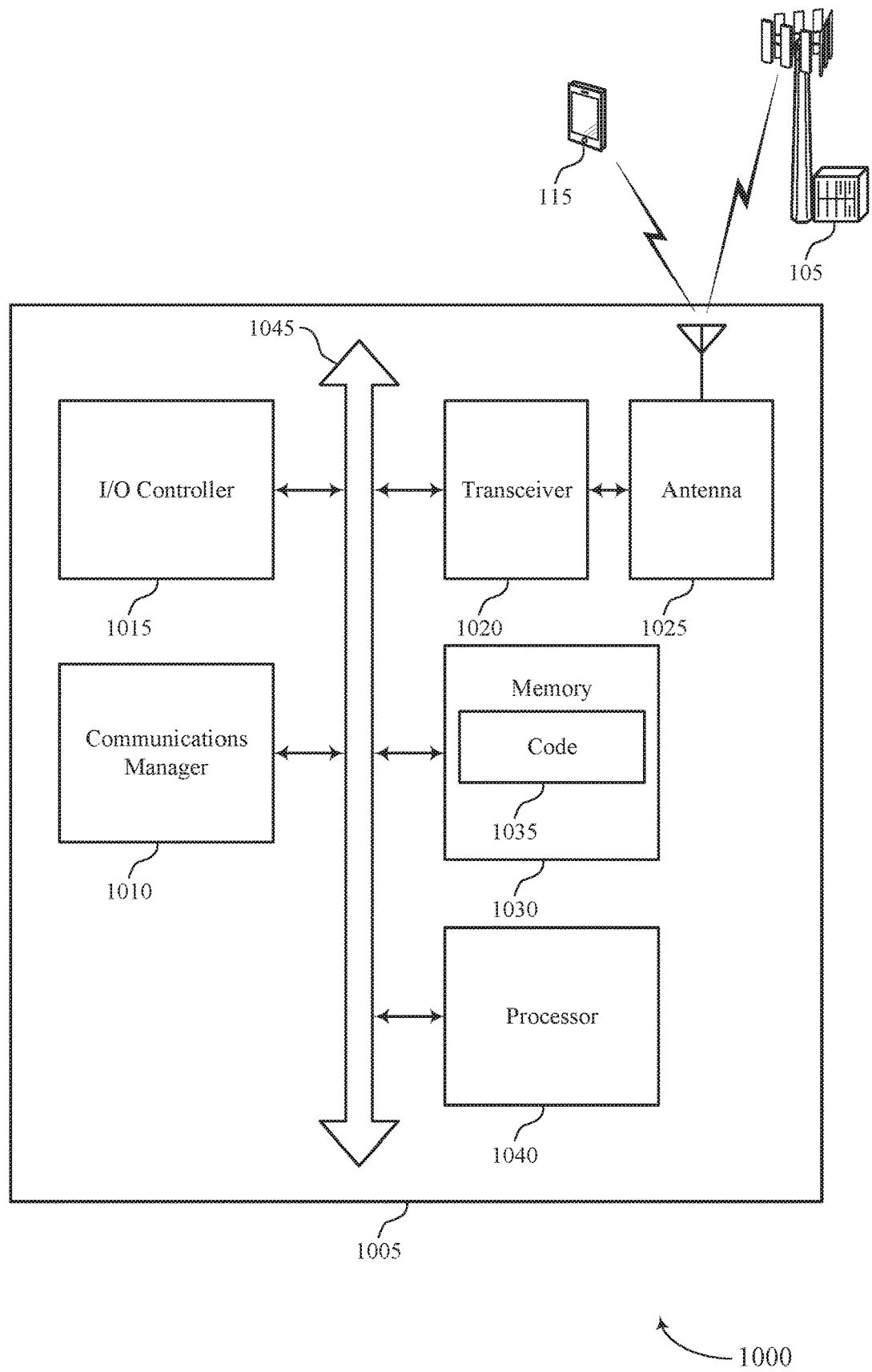
FIG. 10 shows a diagram of a system including a device that supports coefficient indication for channel state information in accordance with aspects of the present disclosure.

FIG. 10 shows a diagram of a system 1000 including a device 1005 that supports coefficient indication for channel state information in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may perform channel state information measurements on one or more reference signal transmissions from a base station, identify, based on the channel state information measurements, a set of cross layer coefficients associated with a set of spatial layers, identify, based on the set of cross layer coefficients, a set of precoding coefficients associated with a spatial layer from the set of spatial layers, and transmit the set of cross layer coefficients and the set of precoding coefficients to the base station. The communications manager 1010 may also perform channel state information measurements on one or more reference signal transmissions from a base station, determine, based on the channel state information measurements, a set of basis vectors for a set of beams and a parameter, where a value of the parameter is based on a number of spatial layers associated with the UE, determine a set of precoding coefficients based on the set of basis vectors and the parameter, and transmit the set of precoding coefficients to the base station.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting coefficient indication for channel state information).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
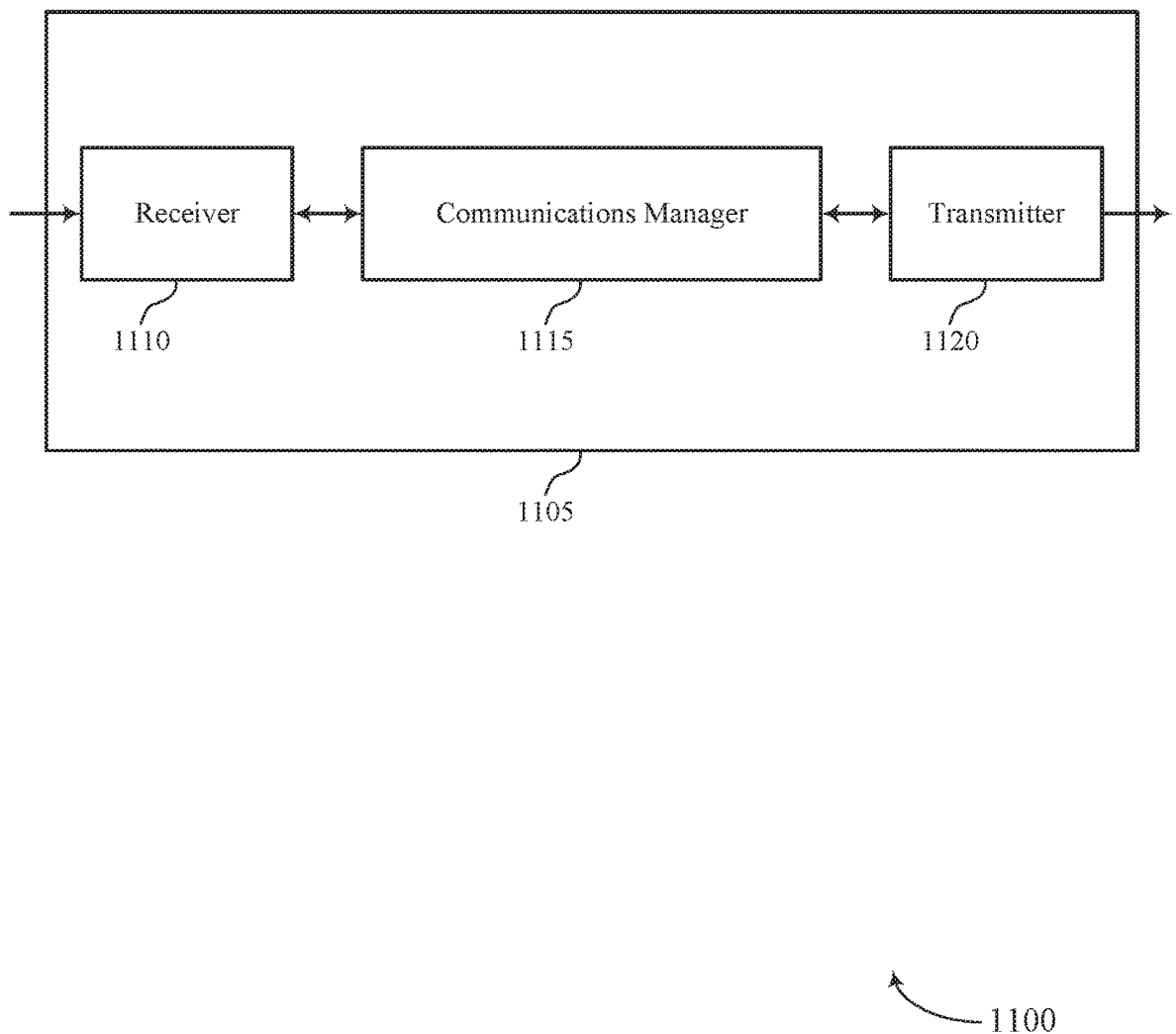
FIGS. 11 and 12 show block diagrams of devices that support coefficient indication for channel state information in accordance with aspects of the present disclosure.

FIG. 11 shows a block diagram 1100 of a device 1105 that supports coefficient indication for channel state information in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to coefficient indication for channel state information, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE, a set of cross layer coefficients associated with a set of spatial layers, receive, from the UE, a set of precoding coefficients associated with a spatial layer from the set of spatial layers, where the set of precoding coefficients is based on the set of cross layer coefficients, and determine a set of basis vectors based on the set of cross layer coefficients and the set of precoding coefficients, where the set of basis vectors is used for determining a coefficient matrix. The communications manager 1115 may also receive, from a UE, a set of precoding coefficients, decode the set of precoding coefficients to obtain a set of basis vectors for a set of beams and a parameter, where a value of the parameter is based on a number of spatial layers associated with the UE, and determine a coefficient matrix based on the set of basis vectors for the set of beams and the parameter. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
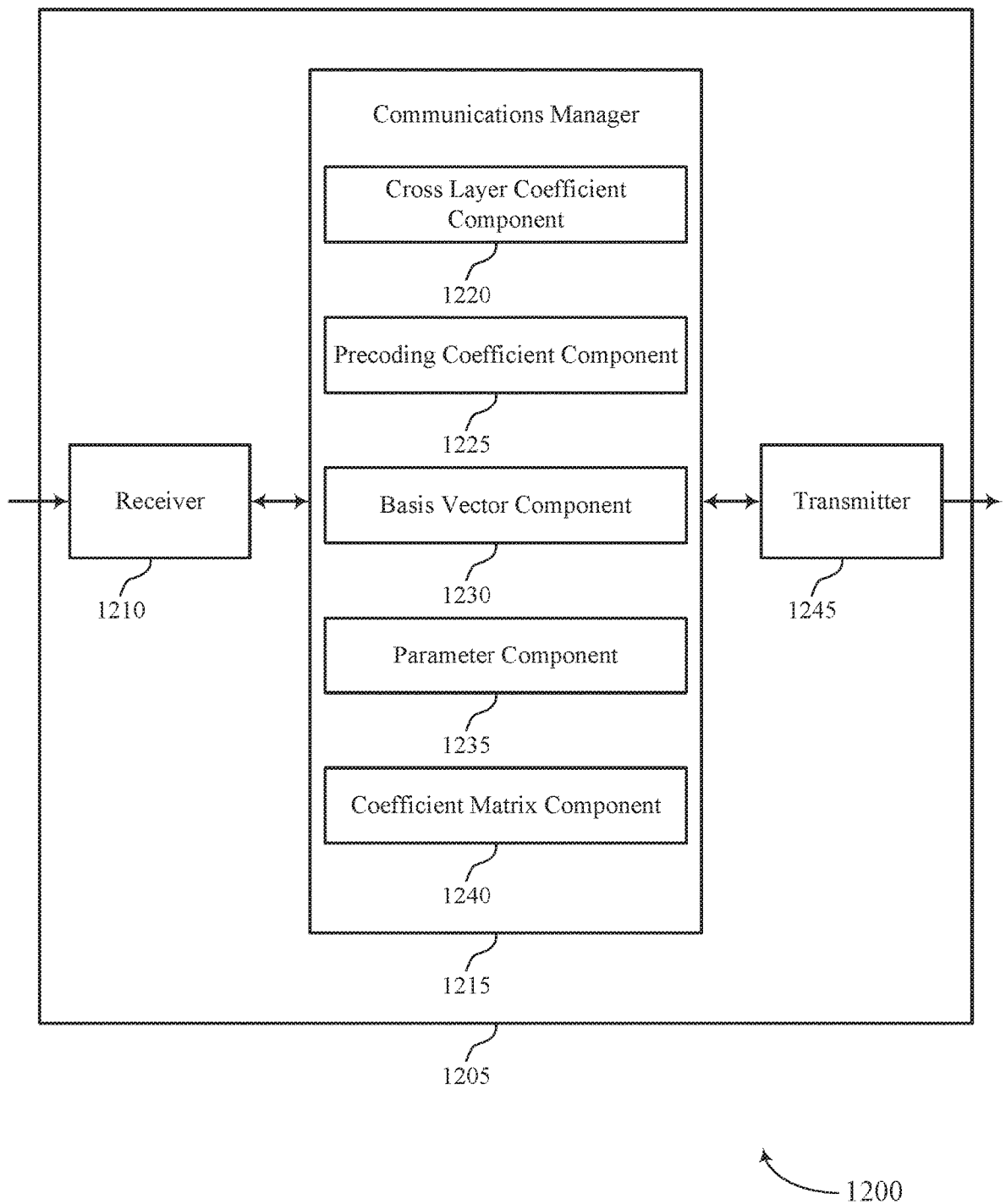

FIG. 12 shows a block diagram 1200 of a device 1205 that supports coefficient indication for channel state information in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to coefficient indication for channel state information, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a cross layer coefficient component 1220, a precoding coefficient component 1225, a basis vector component 1230, a parameter component 1235, and a coefficient matrix component 1240. The communications manager 1215 may be an example of aspects of the communications manager 1410 described herein.

The cross layer coefficient component 1220 may receive, from a UE, a set of cross layer coefficients associated with a set of spatial layers. The precoding coefficient component 1225 may receive, from the UE, a set of precoding coefficients associated with a spatial layer from the set of spatial layers, where the set of precoding coefficients is based on the set of cross layer coefficients. The basis vector component 1230 may determine a set of basis vectors based on the set of cross layer coefficients and the set of precoding coefficients, where the set of basis vectors is used for determining a coefficient matrix. The precoding coefficient component 1225 may receive, from a UE, a set of precoding coefficients. The parameter component 1235 may decode the set of precoding coefficients to obtain a set of basis vectors for a set of beams and a parameter, where a value of the parameter is based on a number of spatial layers associated with the UE. The coefficient matrix component 1240 may determine a coefficient matrix based on the set of basis vectors for the set of beams and the parameter.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
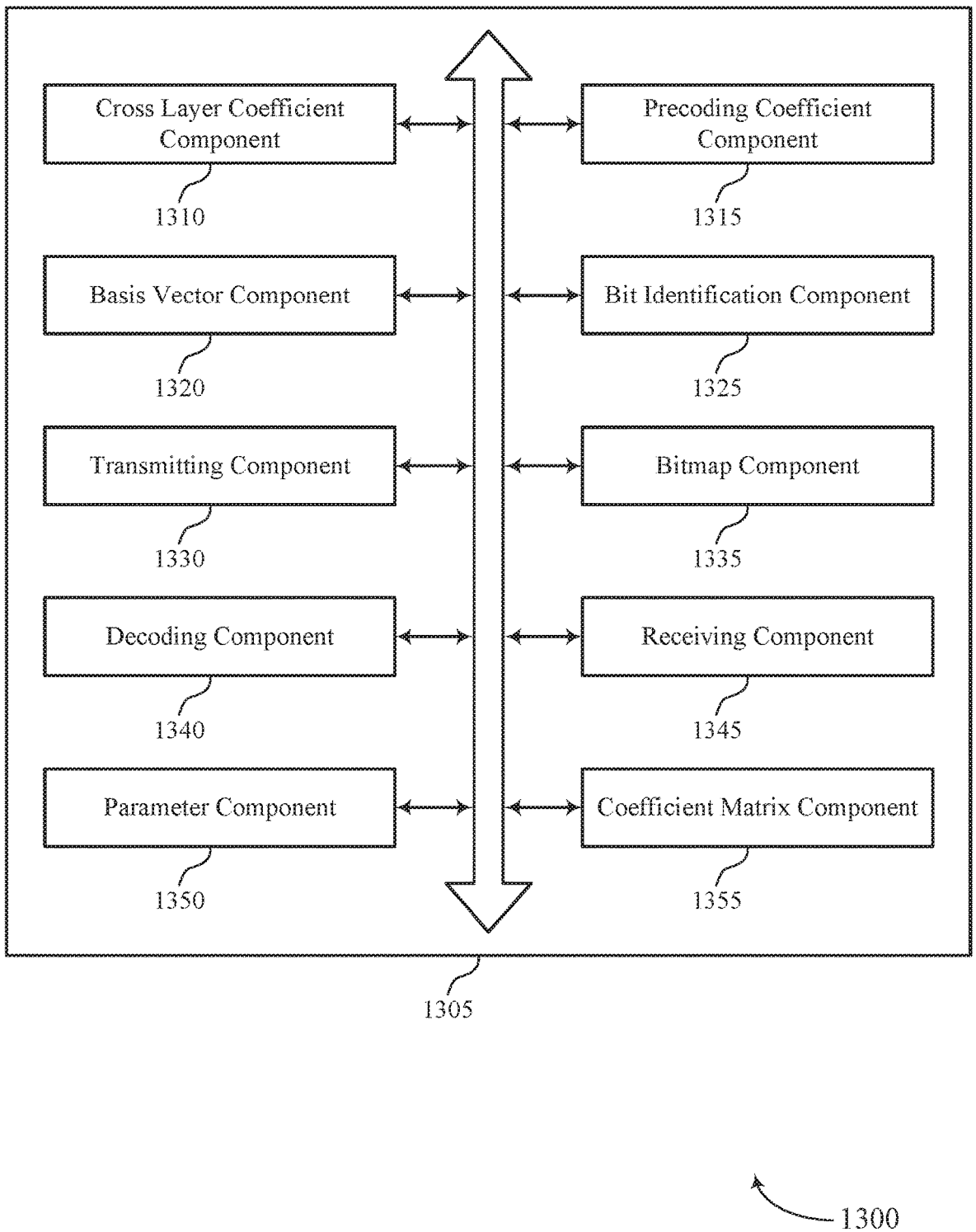
FIG. 13 shows a block diagram of a communications manager that supports coefficient indication for channel state information in accordance with aspects of the present disclosure.

FIG. 13 shows a block diagram 1300 of a communications manager 1305 that supports coefficient indication for channel state information in accordance with aspects of the present disclosure. The communications manager 1305 may be an example of aspects of a communications manager 1115, a communications manager 1215, or a communications manager 1410 described herein. The communications manager 1305 may include a cross layer coefficient component 1310, a precoding coefficient component 1315, a basis vector component 1320, a bit identification component 1325, a transmitting component 1330, a bitmap component 1335, a decoding component 1340, a receiving component 1345, a parameter component 1350, and a coefficient matrix component 1355. Each of these modules may communicate, directly or indirectly, with one another (e.g., via one or more buses).

The cross layer coefficient component 1310 may receive, from a UE, a set of cross layer coefficients associated with a set of spatial layers. In some cases, the set of cross layer coefficients is received using a subset of the determined number of bits. In some cases, the set of cross layer coefficients and the set of precoding coefficients are same across a first polarization and a second polarization. In some cases, the set of cross layer coefficients and the set of precoding coefficients are different across a first polarization and a second polarization. In some cases, one or more cross layer coefficients includes one or more precoding coefficients associated with two or more spatial layers.

The precoding coefficient component 1315 may receive, from the UE, a set of precoding coefficients associated with a spatial layer from the set of spatial layers, where the set of precoding coefficients is based on the set of cross layer coefficients. In some examples, the precoding coefficient component 1315 may receive, from a UE, a set of precoding coefficients. In some cases, a first precoding coefficient associated with a first spatial layer is different from a second precoding coefficient associated with a second spatial layer.

The basis vector component 1320 may determine a set of basis vectors based on the set of cross layer coefficients and the set of precoding coefficients, where the set of basis vectors is used for determining a coefficient matrix. In some examples, the basis vector component 1320 may identify a number of bits associated with the set of basis vectors for a set of beams, where receiving the set of cross layer coefficients is based on the number of bits. The parameter component 1350 may decode the set of precoding coefficients to obtain a set of basis vectors for a set of beams and a parameter, where a value of the parameter is based on a number of spatial layers associated with the UE. In some cases, a first value of the parameter associated with a first set of spatial layers is different from a second value of the parameter associated with a second set of spatial layers.

The coefficient matrix component 1355 may determine a coefficient matrix based on the set of basis vectors for the set of beams and the parameter. The bit identification component 1325 may identify that each bit of the subset of the determined number of bits is set to one. In some examples, the bit identification component 1325 may identify that a remaining number of bits is set to zero, where the subset of the determined number of bits indicates one or more locations of the set of cross layer coefficients.

The transmitting component 1330 may transmit, to the UE, an indication of the set of cross layer coefficients, where receiving the set of cross layer coefficients is based on the transmitted indication. In some examples, the transmitting component 1330 may transmit, to the UE, a set of predefined values associated with the parameter, where the parameter is based on selecting a predefined value from the set of predefined values. In some cases, the set of cross layer coefficients is based on at least one of a number of basis vectors, a number of beams, a number of frequency domain dimensions, or a combination thereof.

The bitmap component 1335 may receive, from the UE, a bitmap indicating the set of precoding coefficients associated with the spatial layer from the set of spatial layers, where a length of the bitmap is based on a number of bits associated with the set of cross layer coefficients. The decoding component 1340 may decode a first encoded report to obtain the set of cross layer coefficients associated with the set of spatial layers. In some examples, decoding a second encoded report to obtain the set of precoding coefficients associated with the spatial layer from the set of spatial layers, where receiving the set of cross layer coefficients and the set of precoding coefficients includes receiving the first encoded report and the second encoded report. In some examples, decoding an encoded report to obtain the set of cross layer coefficients associated with the set of spatial layers and the set of precoding coefficients associated with the spatial layer from the set of spatial layers, where receiving the set of cross layer coefficients and the set of precoding coefficients includes receiving the encoded report. The receiving component 1345 may receive a channel state information report including the set of cross layer coefficients and the set of precoding coefficients.

Figure 14:
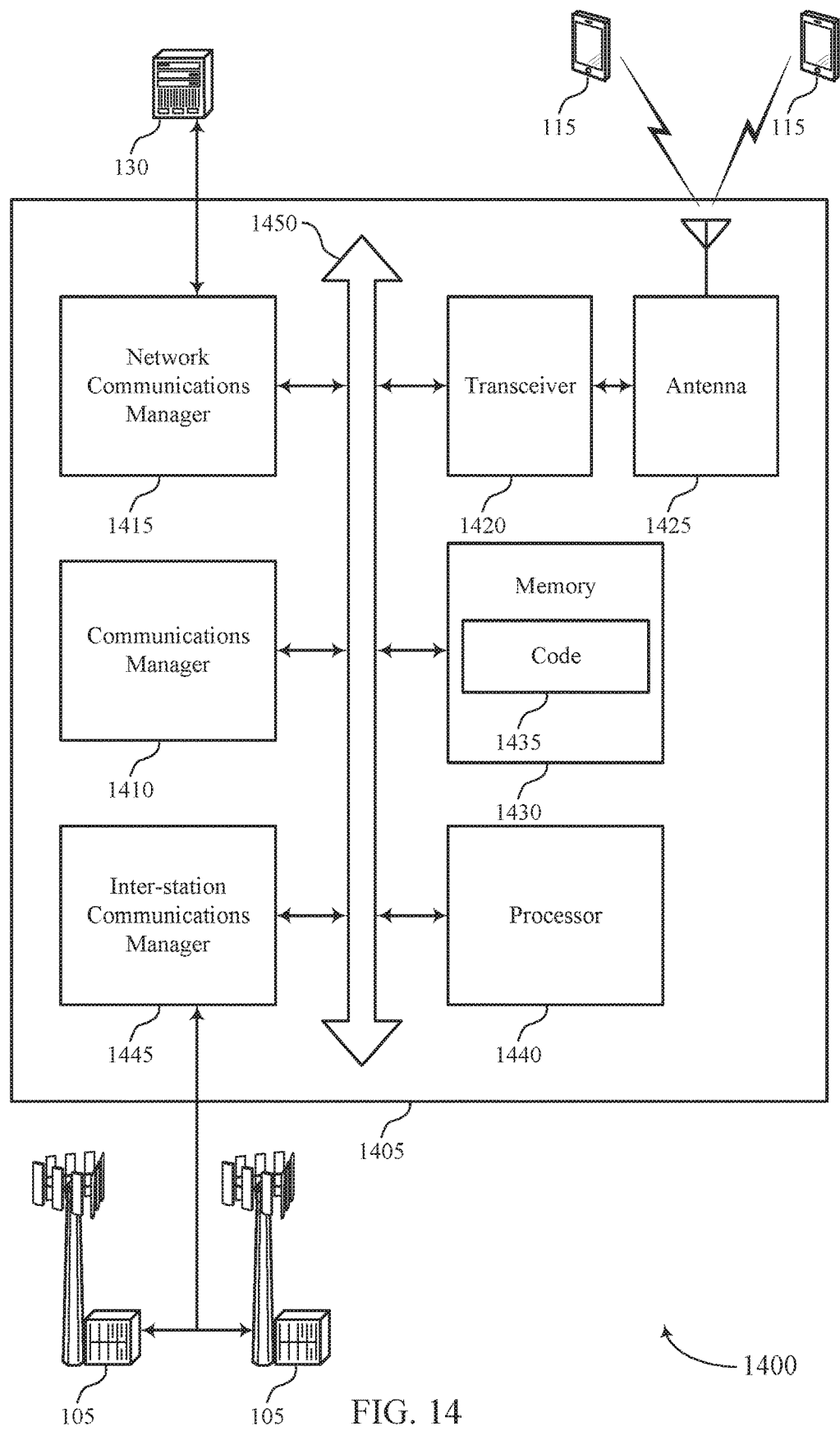
FIG. 14 shows a diagram of a system including a device that supports coefficient indication for channel state information in accordance with aspects of the present disclosure.

FIG. 14 shows a diagram of a system 1400 including a device 1405 that supports coefficient indication for channel state information in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE, a set of cross layer coefficients associated with a set of spatial layers, receive, from the UE, a set of precoding coefficients associated with a spatial layer from the set of spatial layers, where the set of precoding coefficients is based on the set of cross layer coefficients, and determine a set of basis vectors based on the set of cross layer coefficients and the set of precoding coefficients, where the set of basis vectors is used for determining a coefficient matrix. The communications manager 1410 may also receive, from a UE, a set of precoding coefficients, decode the set of precoding coefficients to obtain a set of basis vectors for a set of beams and a parameter, where a value of the parameter is based on a number of spatial layers associated with the UE, and determine a coefficient matrix based on the set of basis vectors for the set of beams and the parameter.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting coefficient indication for channel state information).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
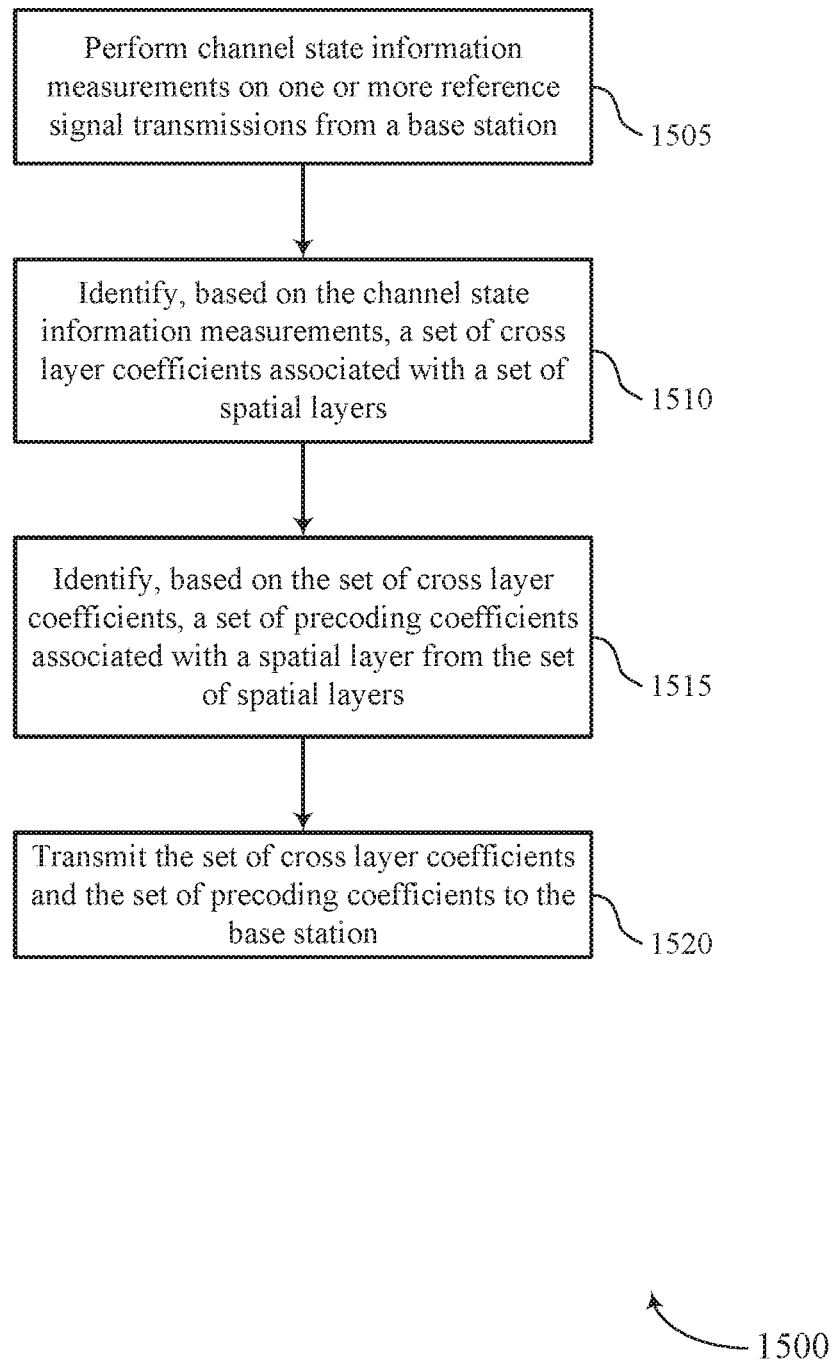
FIGS. 15 through 19 show flowcharts illustrating methods that support coefficient indication for channel state information in accordance with aspects of the present disclosure.

FIG. 15 shows a flowchart illustrating a method 1500 that supports coefficient indication for channel state information in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may perform channel state information measurements on one or more reference signal transmissions from a base station. The operations of 1505 may be performed according to the methods described herein. In some examples, aspects of the operations of 1505 may be performed by a measurement component as described with reference to FIGS. 7 through 10.

At 1510, the UE may identify, based on the channel state information measurements, a set of cross layer coefficients associated with a set of spatial layers. The operations of 1510 may be performed according to the methods described herein. In some examples, aspects of the operations of 1510 may be performed by a cross layer coefficient component as described with reference to FIGS. 7 through 10.

At 1515, the UE may identify, based on the set of cross layer coefficients, a set of precoding coefficients associated with a spatial layer from the set of spatial layers. The operations of 1515 may be performed according to the methods described herein. In some examples, aspects of the operations of 1515 may be performed by a precoding coefficient component as described with reference to FIGS. 7 through 10.

At 1520, the UE may transmit the set of cross layer coefficients and the set of precoding coefficients to the base station. The operations of 1520 may be performed according to the methods described herein. In some examples, aspects of the operations of 1520 may be performed by a transmitting component as described with reference to FIGS. 7 through 10.

Figure 16:
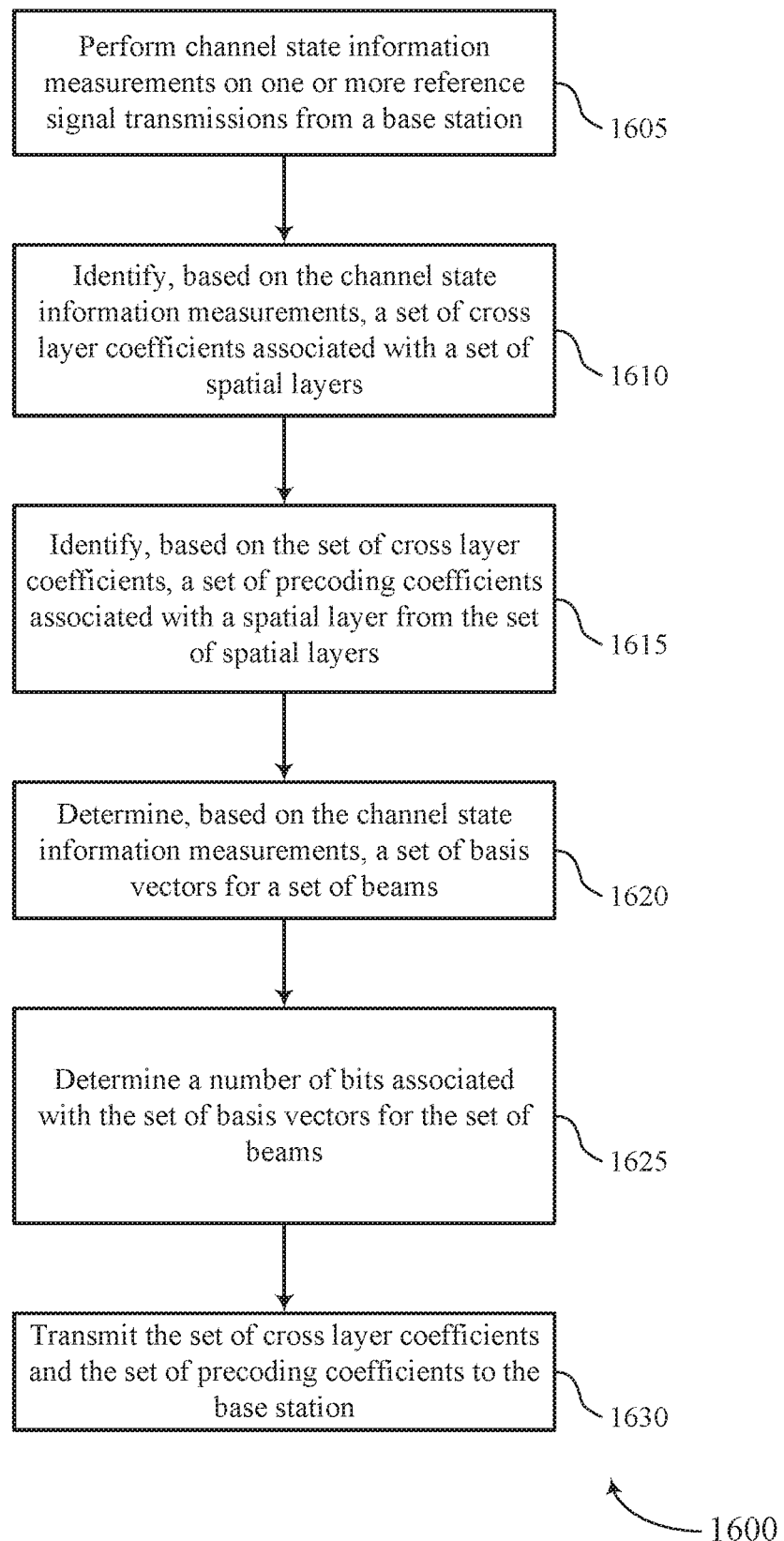

FIG. 16 shows a flowchart illustrating a method 1600 that supports coefficient indication for channel state information in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may perform channel state information measurements on one or more reference signal transmissions from a base station. The operations of 1605 may be performed according to the methods described herein. In some examples, aspects of the operations of 1605 may be performed by a measurement component as described with reference to FIGS. 7 through 10.

At 1610, the UE may identify, based on the channel state information measurements, a set of cross layer coefficients associated with a set of spatial layers. The operations of 1610 may be performed according to the methods described herein. In some examples, aspects of the operations of 1610 may be performed by a cross layer coefficient component as described with reference to FIGS. 7 through 10.

At 1615, the UE may identify, based on the set of cross layer coefficients, a set of precoding coefficients associated with a spatial layer from the set of spatial layers. The operations of 1615 may be performed according to the methods described herein. In some examples, aspects of the operations of 1615 may be performed by a precoding coefficient component as described with reference to FIGS. 7 through 10.

At 1620, the UE may determine, based on the channel state information measurements, a set of basis vectors for a set of beams. The operations of 1620 may be performed according to the methods described herein. In some examples, aspects of the operations of 1620 may be performed by a basis vector component as described with reference to FIGS. 7 through 10.

At 1625, the UE may determine a number of bits associated with the set of basis vectors for the set of beams. The operations of 1625 may be performed according to the methods described herein. In some examples, aspects of the operations of 1625 may be performed by a basis vector component as described with reference to FIGS. 7 through 10.

At 1630, the UE may transmit the set of cross layer coefficients and the set of precoding coefficients to the base station. In some cases, transmitting the set of cross layer coefficients is based on the number of bits. The operations of 1630 may be performed according to the methods described herein. In some examples, aspects of the operations of 1630 may be performed by a transmitting component as described with reference to FIGS. 7 through 10.

Figure 17:
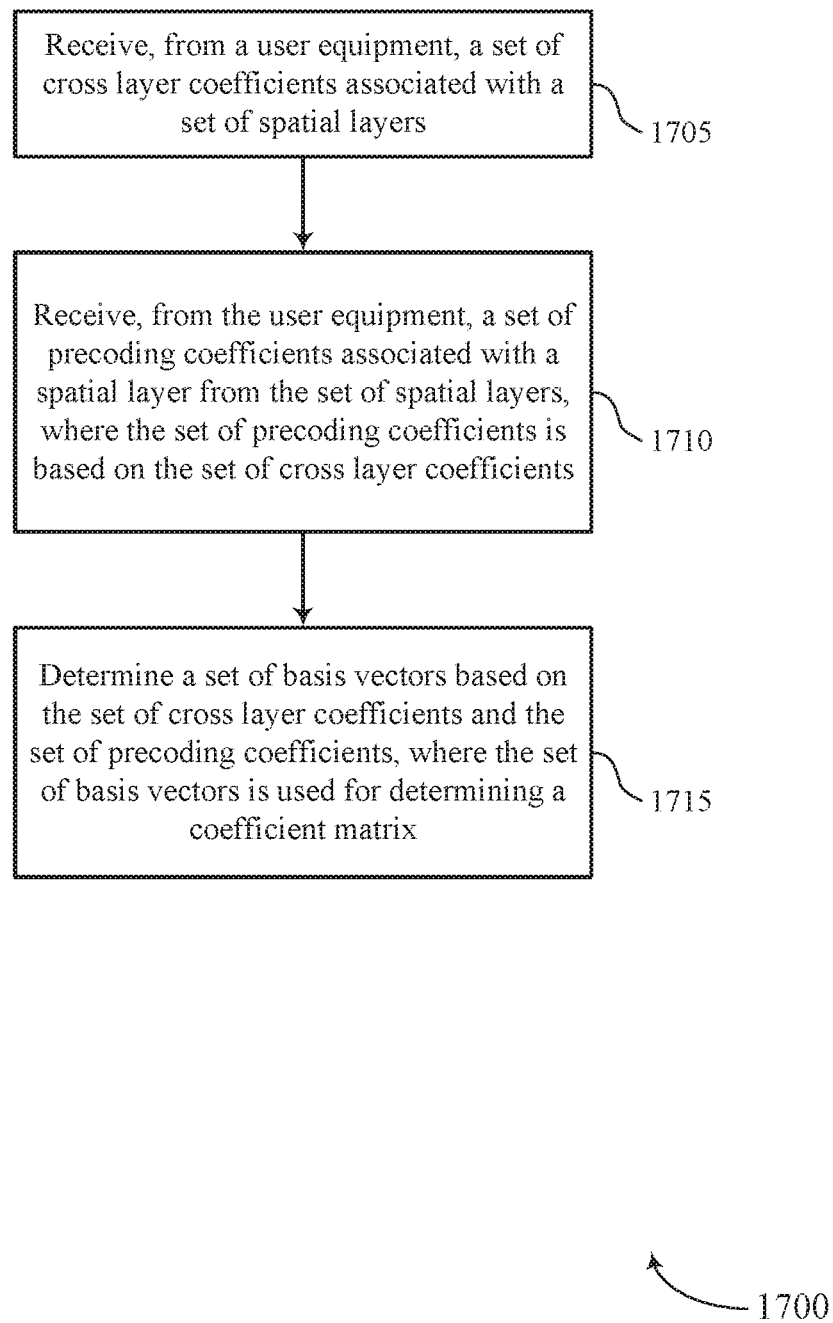

FIG. 17 shows a flowchart illustrating a method 1700 that supports coefficient indication for channel state information in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a set of cross layer coefficients associated with a set of spatial layers. The operations of 1705 may be performed according to the methods described herein. In some examples, aspects of the operations of 1705 may be performed by a cross layer coefficient component as described with reference to FIGS. 11 through 14.

At 1710, the base station may receive, from the UE, a set of precoding coefficients associated with a spatial layer from the set of spatial layers, where the set of precoding coefficients is based on the set of cross layer coefficients. The operations of 1710 may be performed according to the methods described herein. In some examples, aspects of the operations of 1710 may be performed by a precoding coefficient component as described with reference to FIGS. 11 through 14.

At 1715, the base station may determine a set of basis vectors based on the set of cross layer coefficients and the set of precoding coefficients, where the set of basis vectors is used for determining a coefficient matrix. The operations of 1715 may be performed according to the methods described herein. In some examples, aspects of the operations of 1715 may be performed by a basis vector component as described with reference to FIGS. 11 through 14.

Figure 18:
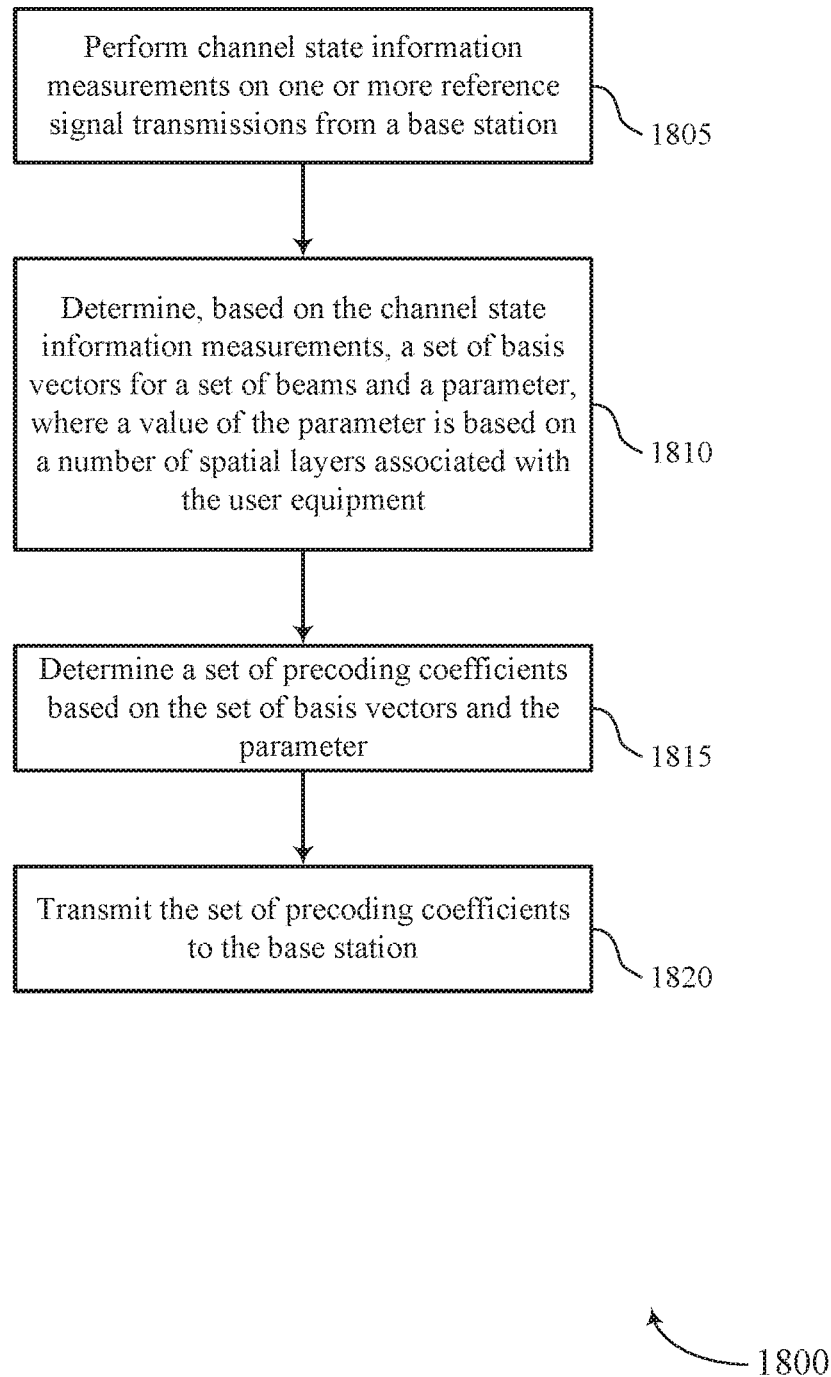

FIG. 18 shows a flowchart illustrating a method 1800 that supports coefficient indication for channel state information in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may perform channel state information measurements on one or more reference signal transmissions from a base station. The operations of 1805 may be performed according to the methods described herein. In some examples, aspects of the operations of 1805 may be performed by a measurement component as described with reference to FIGS. 7 through 10.

At 1810, the UE may determine, based on the channel state information measurements, a set of basis vectors for a set of beams and a parameter, where a value of the parameter is based on a number of spatial layers associated with the UE. The operations of 1810 may be performed according to the methods described herein. In some examples, aspects of the operations of 1810 may be performed by a parameter component as described with reference to FIGS. 7 through 10.

At 1815, the UE may determine a set of precoding coefficients based on the set of basis vectors and the parameter. The operations of 1815 may be performed according to the methods described herein. In some examples, aspects of the operations of 1815 may be performed by a precoding coefficient component as described with reference to FIGS. 7 through 10.

At 1820, the UE may transmit the set of precoding coefficients to the base station. The operations of 1820 may be performed according to the methods described herein. In some examples, aspects of the operations of 1820 may be performed by a transmitting component as described with reference to FIGS. 7 through 10.

Figure 19:
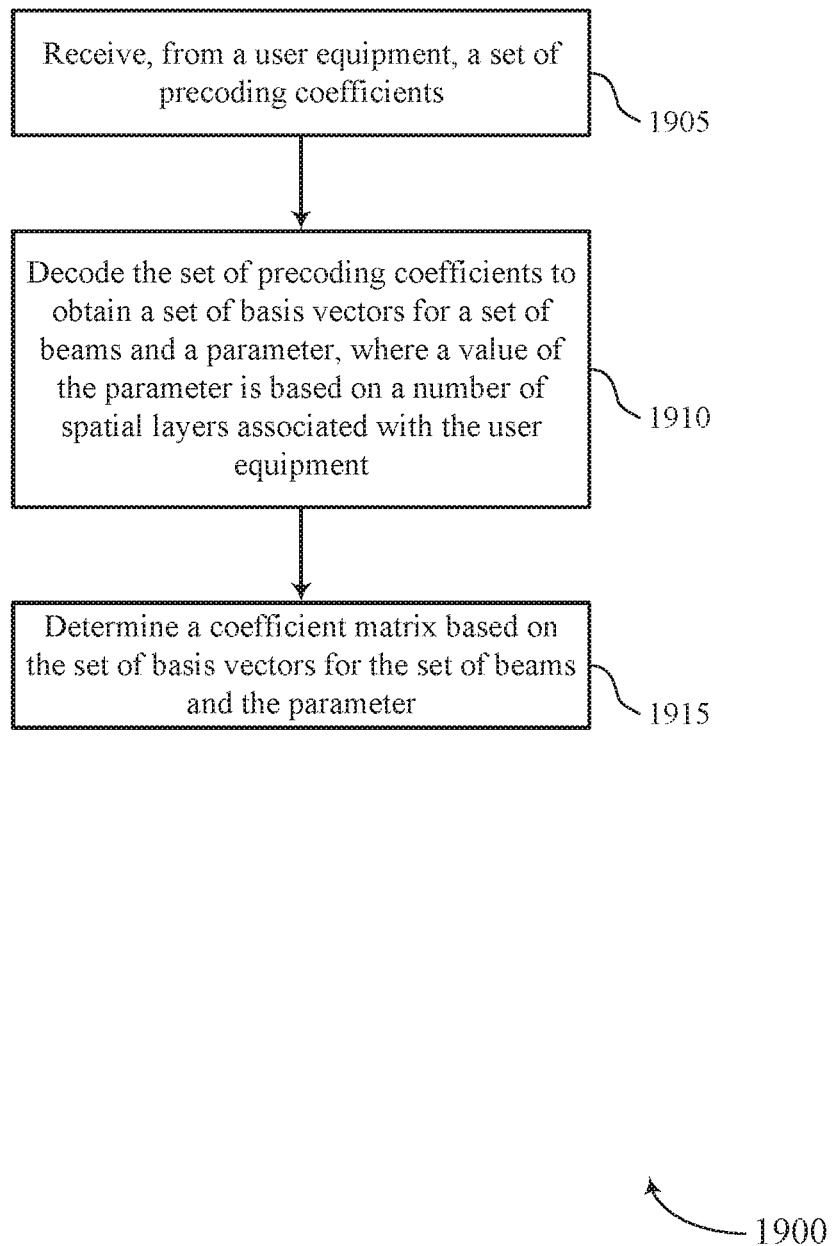

FIG. 19 shows a flowchart illustrating a method 1900 that supports coefficient indication for channel state information in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a set of precoding coefficients. The operations of 1905 may be performed according to the methods described herein. In some examples, aspects of the operations of 1905 may be performed by a precoding coefficient component as described with reference to FIGS. 11 through 14.

At 1910, the base station may decode the set of precoding coefficients to obtain a set of basis vectors for a set of beams and a parameter, where a value of the parameter is based on a number of spatial layers associated with the UE. The operations of 1910 may be performed according to the methods described herein. In some examples, aspects of the operations of 1910 may be performed by a parameter component as described with reference to FIGS. 11 through 14.

At 1915, the base station may determine a coefficient matrix based on the set of basis vectors for the set of beams and the parameter. The operations of 1915 may be performed according to the methods described herein. In some examples, aspects of the operations of 1915 may be performed by a coefficient matrix component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   performing channel state information measurements on one or more reference signal transmissions from a base station;
   identifying, based at least in part on the channel state information measurements, a set of cross layer coefficients associated with a set of spatial layers;
   identifying, based at least in part on the set of cross layer coefficients, a set of precoding coefficients associated with a spatial layer from the set of spatial layers; and
   transmitting the set of cross layer coefficients and a bitmap indicating the set of precoding coefficients to the base station, wherein a length of the bitmap is based at least in part on a quantity of bits associated with the set of cross layer coefficients.

2. The method of claim 1, further comprising:
   determining, based at least in part on the channel state information measurements, a plurality of basis vectors for a set of beams; and
   determining a number of bits associated with the plurality of basis vectors for the set of beams, wherein transmitting the set of cross layer coefficients is based at least in part on the number of bits.

3. The method of claim 2, wherein the set of cross layer coefficients is transmitted using a subset of the determined number of bits.

4. The method of claim 3, further comprising:
   setting each bit of the subset of the determined number of bits to one and setting a remaining number of bits to zero, wherein the subset of the determined number of bits indicates one or more locations of the set of cross layer coefficients.

5. The method of claim 1, further comprising:
   receiving, from the base station, an indication of the set of cross layer coefficients, wherein identifying the set of cross layer coefficients is based at least in part on the received indication.

6. The method of claim 5, wherein the set of cross layer coefficients is based at least in part on at least one of a number of basis vectors, a number of beams, a number of frequency domain dimensions, or a combination thereof.

7. The method of claim 1, further comprising:
   determining a set of non-zero coefficients associated with the set of cross layer coefficients, wherein the bitmap indicates the set of precoding coefficients associated with the spatial layer from the set of spatial layers based at least in part on the set of non-zero coefficients associated with the set of cross layer coefficients.

8. The method of claim 1, wherein a first precoding coefficient associated with a first spatial layer is different from a second precoding coefficient associated with a second spatial layer.

9. The method of claim 1, wherein the set of cross layer coefficients and the set of precoding coefficients are same across a first polarization and a second polarization.

10. The method of claim 1, wherein the set of cross layer coefficients and the set of precoding coefficients are different across a first polarization and a second polarization.

11. The method of claim 1, wherein one or more cross layer coefficients comprises one or more precoding coefficients associated with two or more spatial layers.

12. The method of claim 1, further comprising:
    encoding the set of cross layer coefficients associated with the set of spatial layers to obtain a first encoded report; and
    encoding the set of precoding coefficients associated with the spatial layer from the set of spatial layers to obtain a second encoded report, wherein transmitting the set of cross layer coefficients and the bitmap indicating the set of precoding coefficients comprises transmitting the first encoded report and the second encoded report.

13. The method of claim 1, further comprising:
    encoding the set of cross layer coefficients associated with the set of spatial layers and the set of precoding coefficients associated with the spatial layer from the set of spatial layers to obtain an encoded report, wherein transmitting the set of cross layer coefficients and the bitmap indicating the set of precoding coefficients comprises transmitting the encoded report.

14. The method of claim 1, further comprising:
    transmitting a channel state information report comprising the set of cross layer coefficients and the bitmap indicating the set of precoding coefficients.

15. A method for wireless communication at a base station, comprising:
    receiving, from a user equipment, a set of cross layer coefficients associated with a set of spatial layers;
    receiving, from the user equipment, a bitmap indicating a set of precoding coefficients associated with a spatial layer from the set of spatial layers, wherein the set of precoding coefficients is based at least in part on the set of cross layer coefficients, and wherein a length of the bitmap is based at least in part on a quantity of bits associated with the set of cross layer coefficients; and determining a plurality of basis vectors based at least in part on the set of cross layer coefficients and the set of precoding coefficients, wherein the plurality of basis vectors is used for determining a coefficient matrix.

16. The method of claim 15, further comprising:
identifying a number of bits associated with the plurality of basis vectors for a set of beams, wherein receiving the set of cross layer coefficients is based at least in part on the number of bits.

17. The method of claim 16, wherein the set of cross layer coefficients is received using a subset of the number of bits.

18. The method of claim 17, further comprising:
identifying that each bit of the subset of the number of bits is set to one; and
identifying that a remaining number of bits is set to zero, wherein the subset of the number of bits indicates one or more locations of the set of cross layer coefficients.

19. The method of claim 15, further comprising:
transmitting, to the user equipment, an indication of the set of cross layer coefficients, wherein receiving the set of cross layer coefficients is based at least in part on the transmitted indication.

20. The method of claim 19, wherein the set of cross layer coefficients is based at least in part on at least one of a number of basis vectors, a number of beams, a number of frequency domain dimensions, or a combination thereof.

21. The method of claim 15,
wherein the bitmap indicates the set of precoding coefficients associated with the spatial layer from the set of spatial layers based at least in part on a set of non-zero coefficients associated with the set of cross layer coefficients.

22. The method of claim 15, wherein a first precoding coefficient associated with a first spatial layer is different from a second precoding coefficient associated with a second spatial layer.

23. The method of claim 15, wherein the set of cross layer coefficients and the set of precoding coefficients are same across a first polarization and a second polarization.

24. The method of claim 15, wherein the set of cross layer coefficients and the set of precoding coefficients are different across a first polarization and a second polarization.

25. The method of claim 15, wherein one or more cross layer coefficients comprises one or more precoding coefficients associated with two or more spatial layers.

26. The method of claim 15, further comprising:
decoding a first encoded report to obtain the set of cross layer coefficients associated with the set of spatial layers; and
decoding a second encoded report to obtain the bitmap indicating the set of precoding coefficients associated with the spatial layer from the set of spatial layers, wherein receiving the set of cross layer coefficients and the bitmap indicating the set of precoding coefficients comprises receiving the first encoded report and the second encoded report.

27. The method of claim 15, further comprising:
decoding an encoded report to obtain the set of cross layer coefficients associated with the set of spatial layers and the bitmap indicating the set of precoding coefficients associated with the spatial layer from the set of spatial layers, wherein receiving the set of cross layer coefficients and the bitmap indicating the set of precoding coefficients comprises receiving the encoded report.

28. The method of claim 15, further comprising:
receiving a channel state information report comprising the set of cross layer coefficients and the bitmap indicating the set of precoding coefficients.

29. A method for wireless communication at a user equipment, comprising:
performing channel state information measurements on one or more reference signal transmissions from a base station;
determining, based at least in part on the channel state information measurements, a plurality of basis vectors for a set of beams and a parameter, wherein a value of the parameter is based at least in part on a number of spatial layers associated with the user equipment;
determining a set of precoding coefficients based at least in part on the plurality of basis vectors and the parameter; and
transmitting a bitmap indicating the set of precoding coefficients to the base station, wherein a length of the bitmap is based at least in part on a quantity of bits associated with a set of cross layer coefficients.

30. The method of claim 29, further comprising:
receiving a set of predefined values associated with the parameter, wherein determining the parameter is based at least in part on selecting a predefined value from the set of predefined values.

31. The method of claim 29, wherein a first value of the parameter associated with a first set of spatial layers is different from a second value of the parameter associated with a second set of spatial layers.

32. A method for wireless communication at a base station, comprising:
receiving, from a user equipment, a bitmap indicating a set of precoding coefficients, wherein a length of the bitmap is based at least in part on a quantity of bits associated with a set of cross layer coefficients;
decoding the set of precoding coefficients to obtain a plurality of basis vectors for a set of beams and a parameter, wherein a value of the parameter is based at least in part on a number of spatial layers associated with the user equipment; and
determining a coefficient matrix based at least in part on the plurality of basis vectors for the set of beams and the parameter.

33. The method of claim 32, further comprising:
transmitting, to the user equipment, a set of predefined values associated with the parameter, wherein the parameter is based at least in part on selecting a predefined value from the set of predefined values.

34. The method of claim 32, wherein a first value of the parameter associated with a first set of spatial layers is different from a second value of the parameter associated with a second set of spatial layers.

* * * * *